(12) United States Patent
Franca et al.

(10) Patent No.: US 10,486,845 B2
(45) Date of Patent: Nov. 26, 2019

(54) PROCESS FOR IN SITU PRODUCTION OF MICROCAPILLARY DISPENSING SYSTEM FOR FLEXIBLE POUCH

(71) Applicant: Dow Global Technologies LLC, Midland, MI (US)

(72) Inventors: Marcos P. Franca, Sao Paulo (BR); Bruno Rufato Pereira, Sao Paulo (BR); Wenyi W. Huang, Midland, MI (US); Laura J. Dietsche, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 221 days.

(21) Appl. No.: 15/740,119

(22) PCT Filed: Jun. 24, 2016

(86) PCT No.: PCT/US2016/039260
§ 371 (c)(1),
(2) Date: Dec. 27, 2017

(87) PCT Pub. No.: WO2017/003865
PCT Pub. Date: Jan. 5, 2017

(65) Prior Publication Data
US 2018/0186536 A1   Jul. 5, 2018

Related U.S. Application Data

(60) Provisional application No. 62/185,939, filed on Jun. 29, 2015.

(51) Int. Cl.
*B65B 61/18* (2006.01)
*B65B 3/02* (2006.01)
(Continued)

(52) U.S. Cl.
CPC ............ *B65B 61/18* (2013.01); *B05B 11/047* (2013.01); *B31B 70/8123* (2017.08); *B32B 3/08* (2013.01);
(Continued)

(58) Field of Classification Search
CPC .......... B65B 3/02; B65B 3/045; B65B 61/18; B65B 61/186; B65D 75/58;
(Continued)

(56) References Cited

U.S. PATENT DOCUMENTS 2,864,108 A * 12/1958 Johnson .................. E04F 21/06
401/262
2,939,598 A * 6/1960 Donleavy ............... A61J 9/001
215/11.1
(Continued)

FOREIGN PATENT DOCUMENTS

CN     1724314 A    1/2006
CN   101486437 A    7/2009
(Continued)

OTHER PUBLICATIONS

A. Dobrynin, J. Chem. Phys., vol. 107, No. 21, Dec. 1, 1997, pp. 9234-9238, Phase coexistence in random copolymers.
(Continued)

*Primary Examiner* — Stephen F. Gerrity
(74) *Attorney, Agent, or Firm* — Husch Blackwell LLP

(57) ABSTRACT

In an embodiment of the present disclosure, a process for producing a flexible pouch is provided. The process includes placing a capillary precursor element (CPE) between two opposing flexible films. The flexible films define a common peripheral edge. The CPE comprises an array of pins sandwiched between two opposing polymeric strips. The process includes positioning a first side of the CPE at a first side of the common peripheral edge and positioning a second side
(Continued)

of the CPE at a second side of the common peripheral edge. The process includes first sealing, at a first seal condition, (i) the opposing polymeric strips to each other to form a matrix, and (ii) sealing the matrix to the two opposing flexible films. The process includes removing the array of pins from the matrix to form an in situ microcapillary strip.

18 Claims, 17 Drawing Sheets

(51) Int. Cl.
| | |
|---|---|
| B65D 75/58 | (2006.01) |
| B32B 3/26 | (2006.01) |
| B05B 11/04 | (2006.01) |
| B32B 27/08 | (2006.01) |
| B32B 3/08 | (2006.01) |
| B31B 70/81 | (2017.01) |
| B31B 160/10 | (2017.01) |
| B31B 150/00 | (2017.01) |
| B31B 170/20 | (2017.01) |

(52) U.S. Cl.
CPC .............. B32B 3/26 (2013.01); B32B 27/08 (2013.01); B65B 3/02 (2013.01); B65D 75/5811 (2013.01); B65D 75/5822 (2013.01); *B31B 2150/00* (2017.08); *B31B 2160/10* (2017.08); *B31B 2170/20* (2017.08); *B32B 2307/31* (2013.01); *B32B 2307/546* (2013.01); *B32B 2307/582* (2013.01); *B32B 2439/40* (2013.01)

(58) Field of Classification Search
CPC ............ B65D 75/5811; B65D 75/5822; B31B 70/8123; B05B 1/14; B05B 11/047
USPC ...... 53/410, 412, 133.1–133.3, 133.5–133.8; 222/92, 107, 541.2, 541.6
See application file for complete search history.

(56) References Cited

U.S. PATENT DOCUMENTS

| | | | | |
|---|---|---|---|---|
| 3,092,249 A | * | 6/1963 | Chapman | B65D 81/18 206/210 |
| 3,208,640 A | * | 9/1965 | Paulson | B65D 75/5822 222/94 |
| 3,418,059 A | * | 12/1968 | Robe | B65D 75/5811 401/266 |
| 4,872,556 A | * | 10/1989 | Farmer | B65D 75/5822 222/107 |
| 5,159,962 A | * | 11/1992 | Dow | B65B 3/04 141/174 |
| 5,433,526 A | * | 7/1995 | Wild | B65D 75/58 383/104 |
| 5,493,844 A | * | 2/1996 | Combrink | B65B 51/146 53/410 |
| 6,769,579 B2 | * | 8/2004 | Milian | B65D 83/0055 222/212 |
| 7,059,542 B2 | * | 6/2006 | Garcia et al. | B65D 75/5883 222/107 |
| 8,641,946 B2 | * | 2/2014 | Mackley et al. | B01D 63/066 264/177.16 |
| 2003/0075623 A1 | * | 4/2003 | Bartels et al. | B05B 1/14 239/596 |
| 2003/0094466 A1 | * | 5/2003 | Duquet et al. | B65D 75/5811 222/212 |
| 2003/0218024 A1 | * | 11/2003 | Garcia et al. | B65D 75/5822 222/94 |
| 2004/0188461 A1 | * | 9/2004 | Pennaneac'h et al. | B65D 75/58 222/103 |
| 2013/0209003 A1 | * | 8/2013 | Hansen et al. | B65D 75/58 383/200 |
| 2013/0299607 A1 | * | 11/2013 | Wilkerson et al. | B05B 17/0646 239/328 |
| 2014/0061235 A1 | * | 3/2014 | Ankudinov | B65D 75/5805 222/107 |
| 2015/0315345 A1 | | 11/2015 | Zalamea Bustillo et al. | |
| 2015/0342875 A1 | * | 12/2015 | Haffner | A61K 9/0051 604/890.1 |

FOREIGN PATENT DOCUMENTS

| | | | | |
|---|---|---|---|---|
| CN | 103841944 A | | 6/2014 | |
| EP | 0811561 A1 | * | 12/1997 | ......... B65D 75/5811 |
| FR | 2848996 A1 | * | 6/2004 | ............ B65D 75/58 |
| GB | 2180214 A | | 3/1987 | |
| JP | H06-127561 A | | 5/1994 | |
| KR | 20010070639 A | | 7/2001 | |
| WO | 2010/134083 A1 | | 11/2010 | |

OTHER PUBLICATIONS

I. Potemkin et al., Physical Review E, vol. 57, No. 6, Jun. 1998, pp. 6902-6912, Microphase separation in correlated random copolymers: Mean-field theory and fluctuation corrections.

* cited by examiner

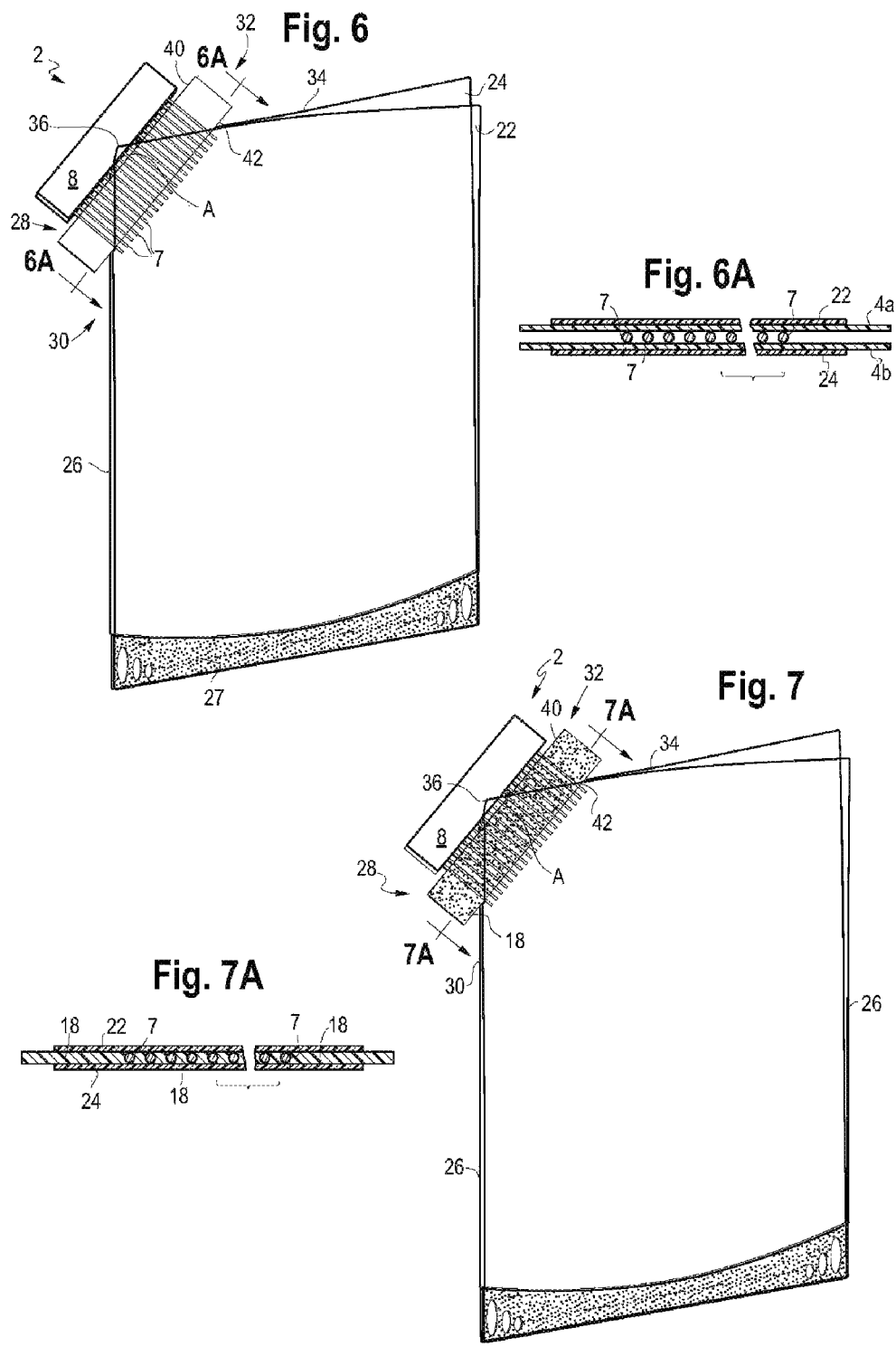

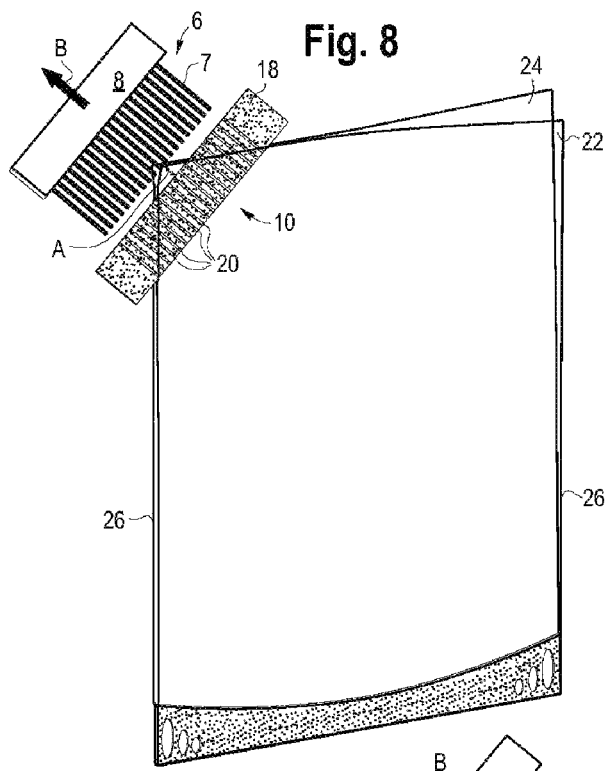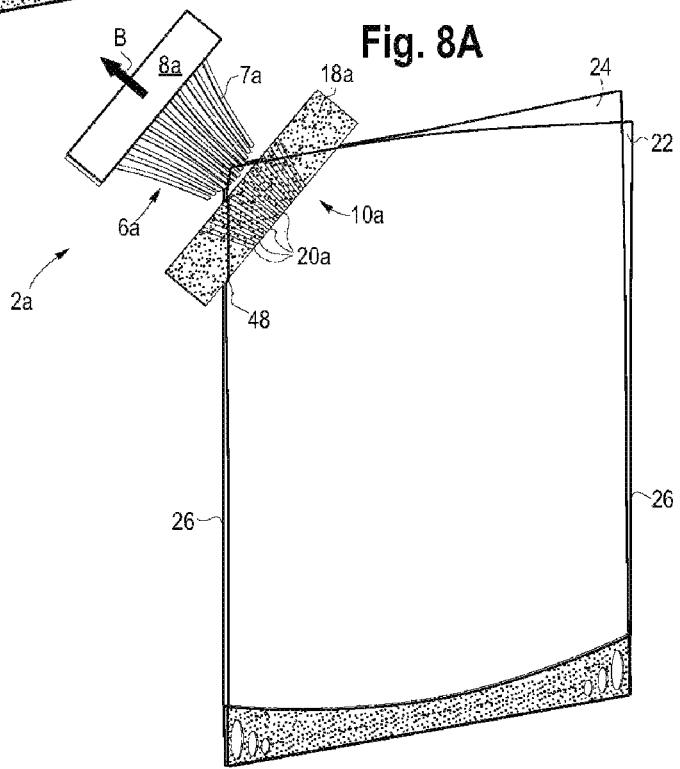

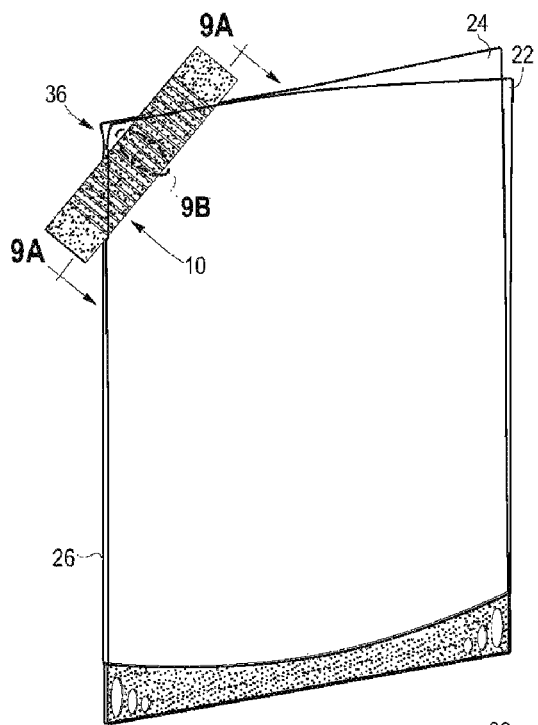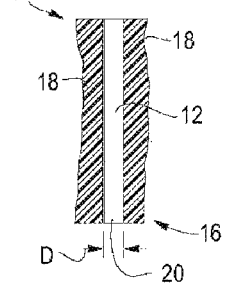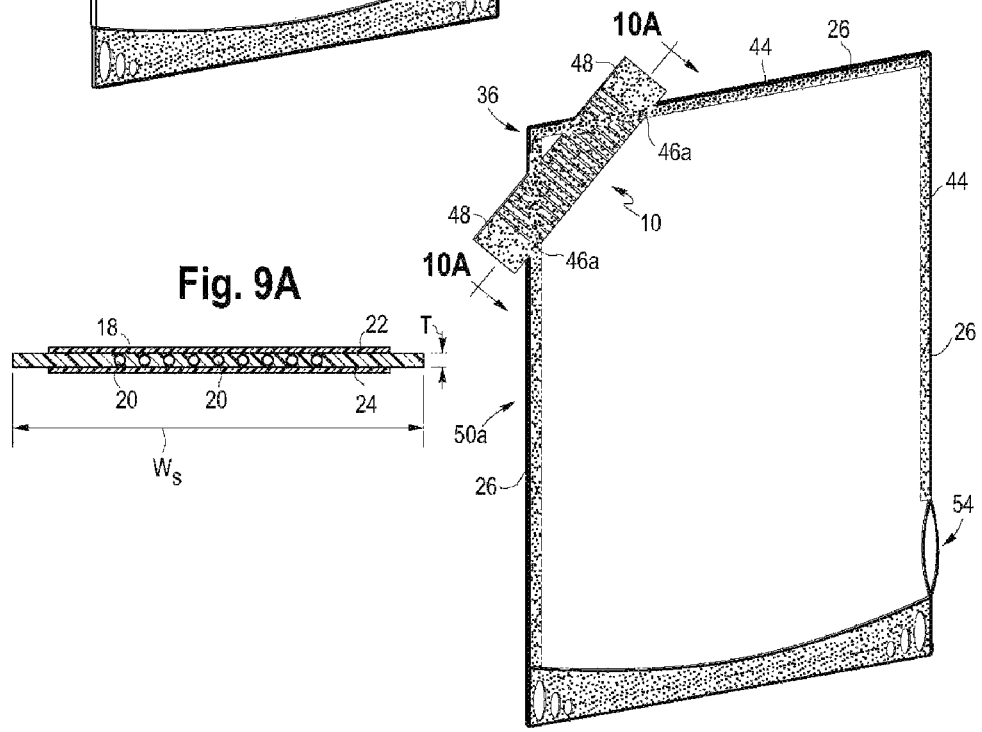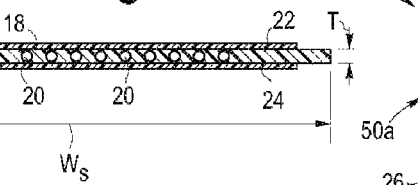

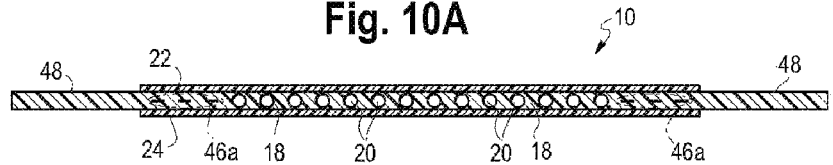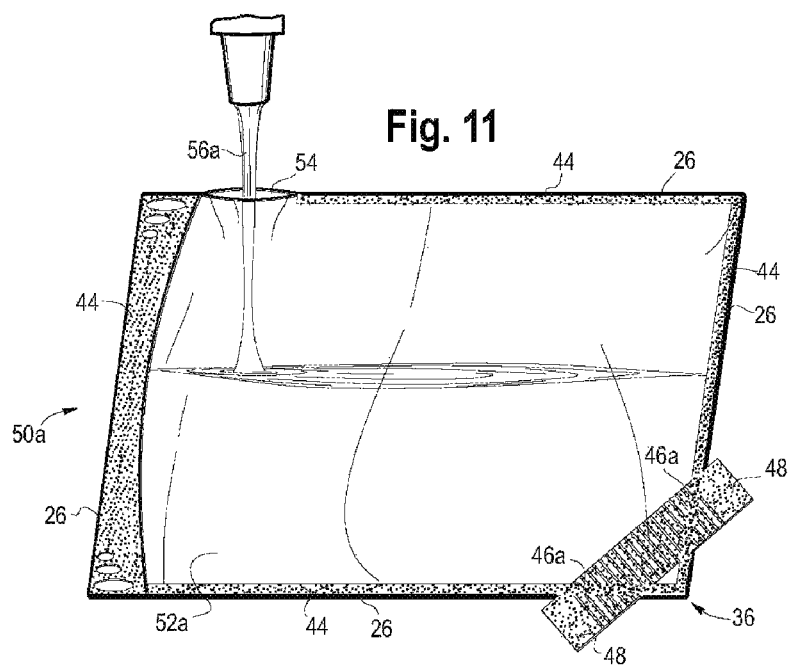

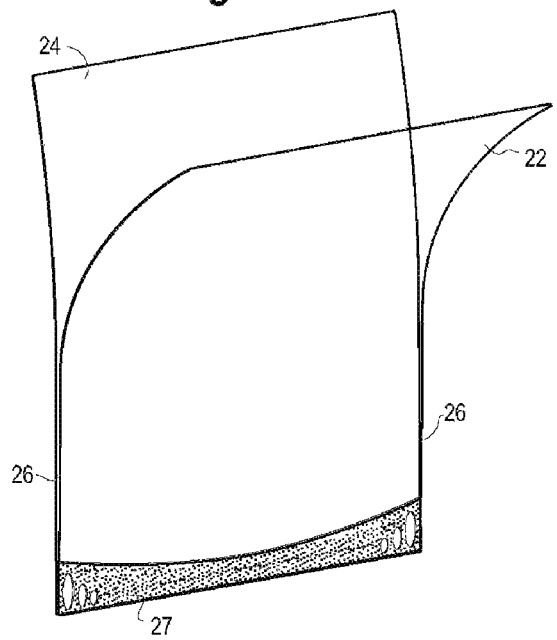
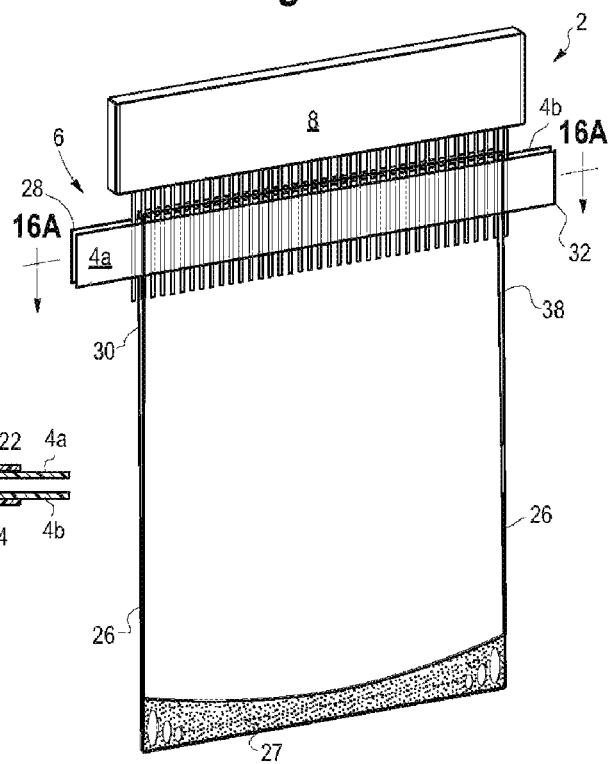
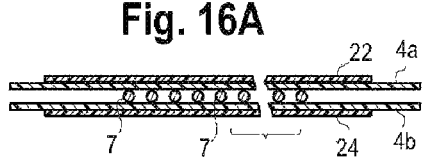

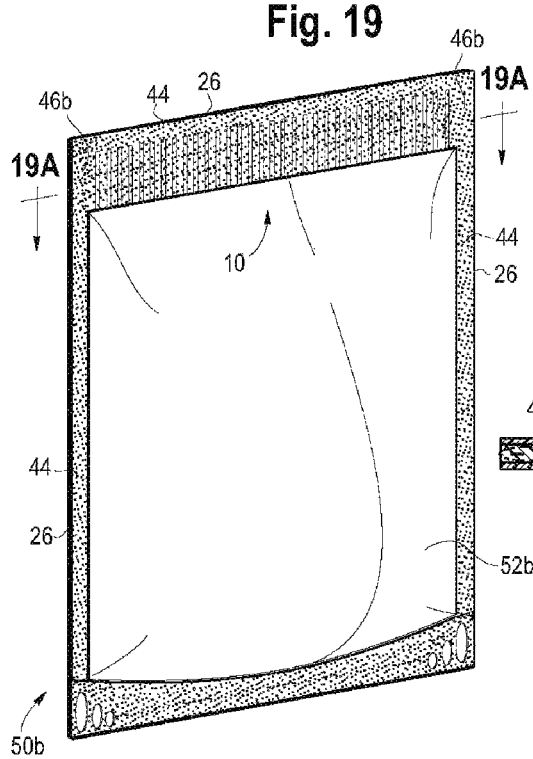
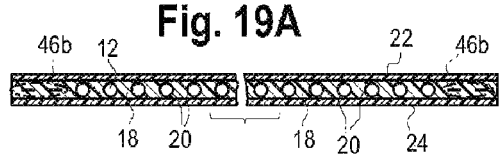
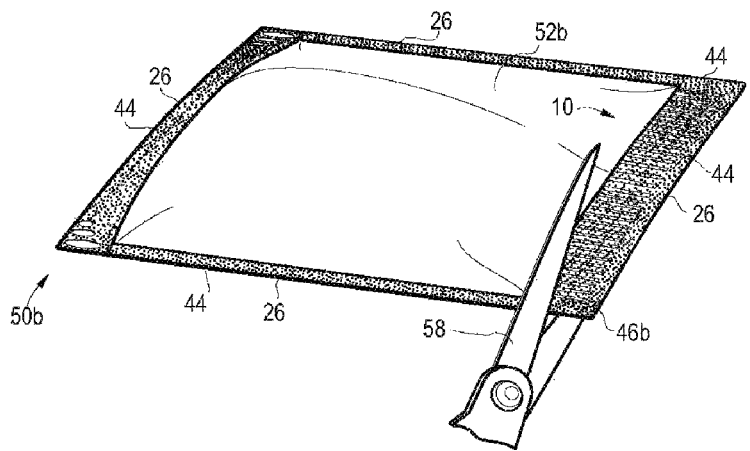

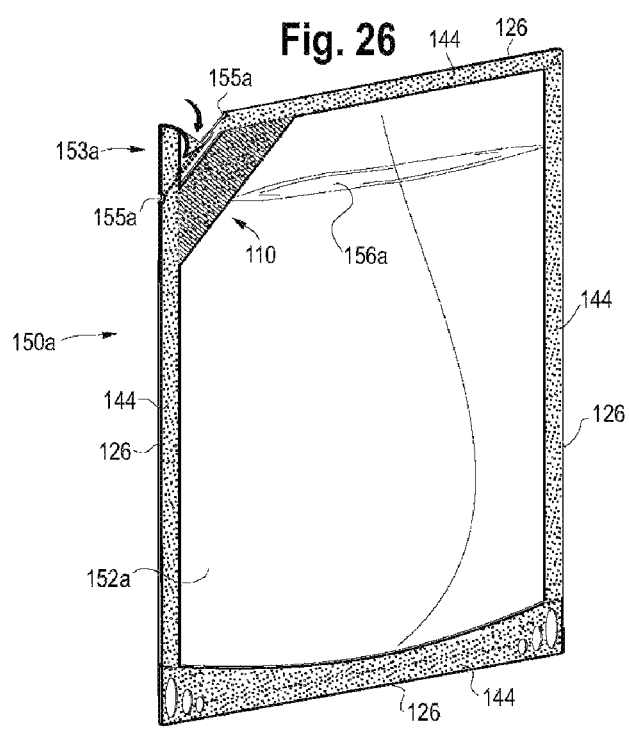
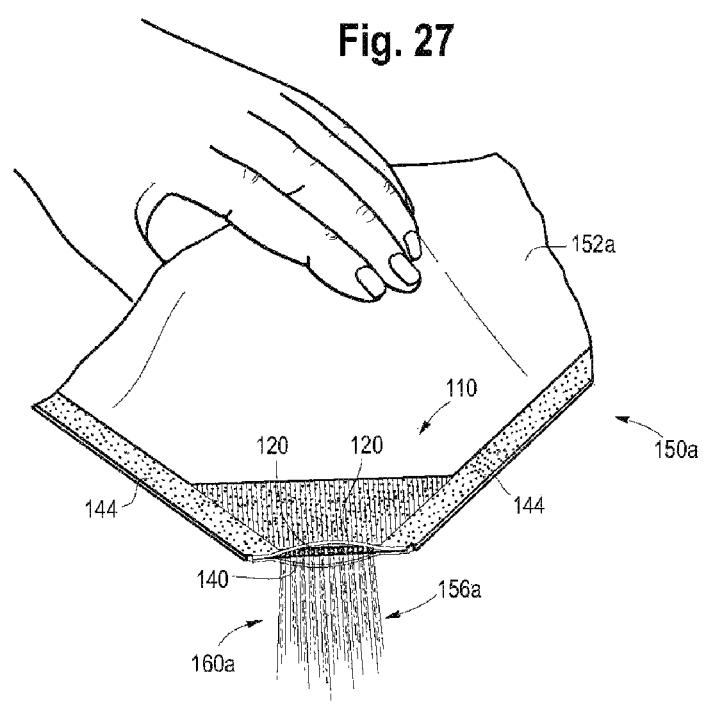

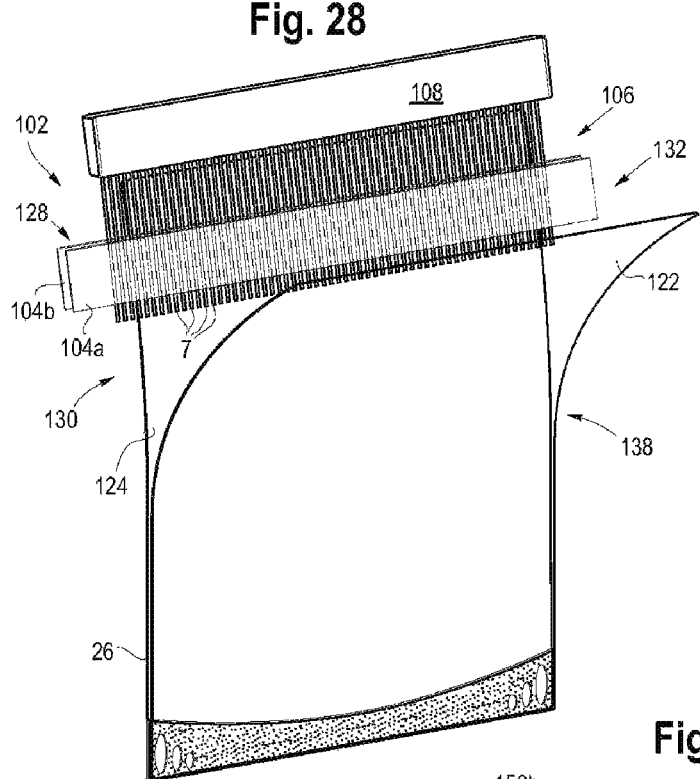
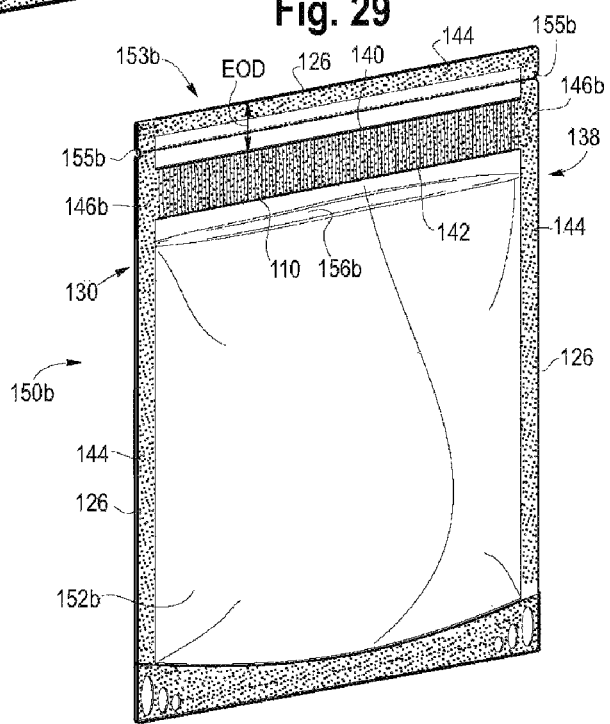

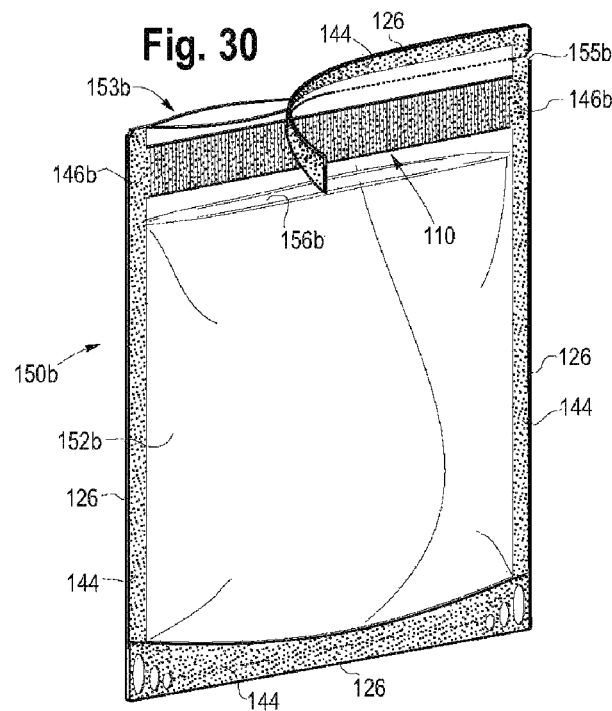
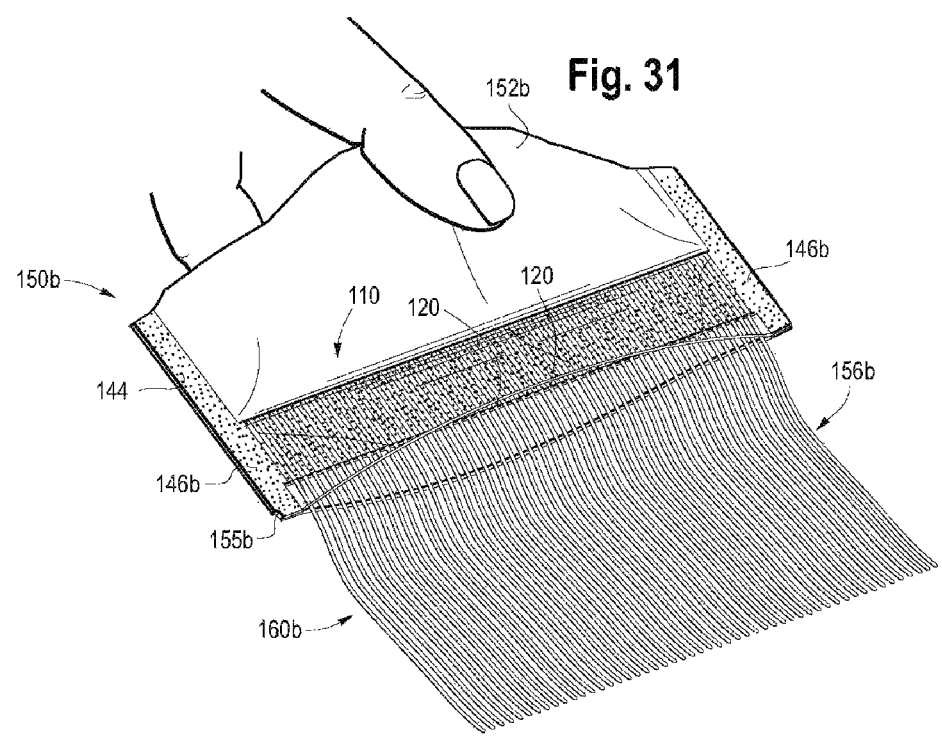

PROCESS FOR IN SITU PRODUCTION OF MICROCAPILLARY DISPENSING SYSTEM FOR FLEXIBLE POUCH

BACKGROUND

The present disclosure is directed to a process for producing a flexible pouch with a microcapillary dispensing system.

Flexible pouches are gaining market acceptance versus rigid packaging in many applications. In the food, home care, and personal care segments, flexible pouches offer the advantages of lower weight, efficient use and access to contents, good visual appeal, and better overall sustainability compared to rigid packaging.

Utilization of flexible pouches is still limited due to lack of specific functionalities, such as flow control, for example. Thus, flexible pouches are typically used as refill packages where the flexible pouch is opened and its contents poured into a previously used rigid container having a removable nozzle or spout. The nozzle or spout provides the rigid container with precision flow control.

Attempts for flow control in flexible pouches is achieved in stand-up pouches (SUPS) with the addition of a rigid fitment that is assembled to the SUP flexible structure by a heat-sealing process. These rigid fitments typically have a canoe shaped base that is placed between the films that form the SUP, the films are heat-sealed using a specialized heat seal bar that has the unique shape to accommodate the spout base. The heat sealing process is inefficient as it is slow, requiring specialized tooling. The heat sealing process is prone to significant amount of failures (leaks) due to the need for precise alignment of the spout between the films. The heat sealing process requires careful quality control, thus the high final cost of the fitment in a SUP makes it prohibitive for some low cost applications.

Rigid containers currently dominate the spray segment. Commonplace are rigid containers with specialized spray nozzles or trigger pump sprays for the application of familiar household products such as disinfectants, glass cleansers, and liquid waxes; personal care items such as creams, lotions, and sunscreen; and even food products such as salad dressings and sauces.

Despite the spray control afforded by such packaging systems, rigid containers are disadvantageous because they are heavy, expensive to produce, and the spray component is typically not recyclable.

The art recognizes the need for a flexible pouch that is capable of delivering its content by way of a spray application and without the need for a rigid spray component. A need further exists for a flexible pouch that is lightweight, recyclable and requires no rigid components.

SUMMARY

The present disclosure provides a process for producing a flexible pouch capable of delivering a spray—and without any rigid components.

In an embodiment, a process for producing a flexible pouch is provided. The process includes placing a capillary precursor element (CPE) between two opposing flexible films. The flexible films define a common peripheral edge. The CPE comprises an array of pins sandwiched between two opposing polymeric strips. The process includes positioning a first side of the CPE at a first side of the common peripheral edge and positioning a second side of the CPE at a second side of the common peripheral edge. The process includes first sealing, at a first seal condition, (i) the opposing polymeric strips to each other to form a matrix, and (ii) sealing the matrix to the two opposing flexible films. The process includes removing the array of pins from the matrix to form an in situ microcapillary strip.

The present disclosure provides another process. In an embodiment, a process for producing a flexible pouch is provided and includes placing a capillary precursor element (CPE) at an edge offset distance between two opposing flexible films. The flexible films define a common peripheral edge. The CPE comprises an array of pins sandwiched between two opposing polymeric strips. The process includes positioning a first side of the CPE at a first side of the common peripheral edge and positioning a second side of the CPE at a second side of the common peripheral edge. The process includes first sealing, at a first seal condition, (i) the opposing polymeric strips to each other to form a matrix, and (ii) sealing the matrix to the two opposing flexible films. The process includes removing the array of pins from the matrix to form an in situ microcapillary strip.

An advantage of the present disclosure is a pillow pouch, a sachet, or a flexible SUP that is capable of delivering a controlled spray of a liquid, without the need for a rigid spray component.

BRIEF DESCRIPTION OF THE DRAWINGS

FIG. 6 is a perspective view of the capillary precursor element positioned at a first side of a common peripheral edge formed by the flexible films and at a second side of the common peripheral edge in accordance with an embodiment of the present disclosure.

FIG. 6A is a sectional view taken along line 6A-6A of FIG. 6.

FIG. 7 is a perspective view of the capillary precursor element sealed between two flexible films in accordance with an embodiment of the present disclosure.

FIG. 7A is a sectional view taken along line 7A-7A of FIG. 7.

FIG. 8 is a perspective view of the removal of an array of pins from a polymeric matrix in accordance with an embodiment of the present disclosure.

FIG. 8A is a perspective view of the removal of an array of non-parallel pins from a polymeric matrix in accordance with an embodiment of the present disclosure.

FIG. 9 is a perspective view of an in situ microcapillary strip in accordance with an embodiment of the present disclosure.

FIG. 9A is a sectional view taken along line 9A-9A of FIG. 9.

FIG. 9B is a sectional view of area 9B of FIG. 9.

FIG. 10 is a perspective view of a flexible pouch having a peripheral seal and a sealed microcapillary segment in accordance with an embodiment of the present disclosure.

FIG. 10A is a sectional view taken along line 10A-10A of FIG. 10.

FIG. 11 is a perspective view of a filling step in accordance with an embodiment of the present disclosure.

FIG. 15 is a perspective view of two flexible films forming a common peripheral edge in accordance with an embodiment of the present disclosure.

FIG. 16 is a perspective view of a capillary precursor element placed between two flexible films in accordance with an embodiment of the present disclosure.

FIG. 16A is a sectional view taken along line 16A-16A of FIG. 16.

FIG. 19 is a perspective view of a filled flexible pouch sealed with a peripheral seal in accordance with an embodiment of the present disclosure.

FIG. 19A is a sectional view taken along line 19A-19A of FIG. 19.

FIG. 20 is a perspective view of the removal of the sealed microcapillary segment in accordance with an embodiment of the present disclosure.

FIG. 26 is a perspective view of the removal of a pocket in accordance with an embodiment of the present disclosure.

FIG. 27 is a perspective view of a dispensing step in accordance with an embodiment of the present disclosure.

FIG. 28 is a perspective view of a capillary precursor element placed at an edge offset distance between two flexible films in accordance with an embodiment of the present disclosure.

FIG. 29 is a perspective view of a filled and sealed flexible pouch in accordance with an embodiment of the present disclosure.

FIG. 30 is a perspective view of the removal of a pocket in accordance with an embodiment of the present disclosure.

FIG. 31 is a perspective view of a dispensing step in accordance with an embodiment of the present disclosure.

DEFINITIONS

Figure 1:
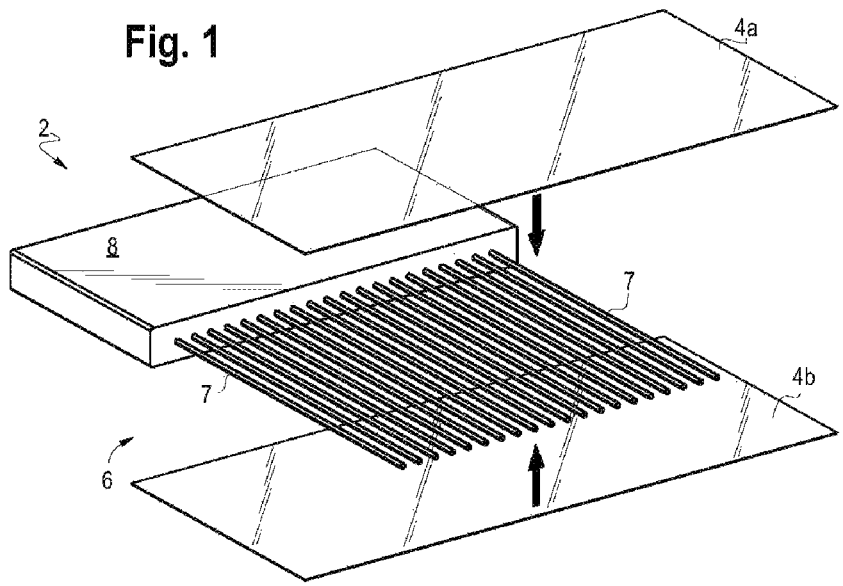
FIG. 1 is an exploded view of a capillary precursor element in accordance with an embodiment of the present disclosure.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792 with results reported in grams (g) per cubic centimeter (cc), or g/cc.

An "ethylene-based polymer," as used herein, is a polymer that contains more than 50 mole percent polymerized ethylene monomer (based on the total amount of polymerizable monomers) and, optionally, may contain at least one comonomer.

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Shore A hardness is measured in accordance with ASTM D 2240.

Tm or "melting point" as used herein (also referred to as a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein, is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

DETAILED DESCRIPTION

The present disclosure provides a process. In an embodiment, a process for producing a flexible pouch is provided and includes placing a capillary precursor element (or CPE) between two opposing flexible films. The flexible films define a common peripheral edge. The CPE includes an array of pins sandwiched between two opposing polymeric strips. The process includes positioning a first side of the CPE at a first side of the common peripheral edge and positioning a second side of the CPE at a second side of the common peripheral edge. The process includes first sealing, at a first sealing condition, (i) the opposing polymeric strips to each other to form a matrix, and (ii) sealing the matrix to the two opposing flexible films. The process includes removing the array of pins from the CPE to form an in situ microcapillary strip.

The process includes second sealing, at a second seal condition, a peripheral seal along at least a portion of the common peripheral edge, the peripheral seal comprising a sealed microcapillary segment.

1. Capillary Precursor Element

Figure 2:
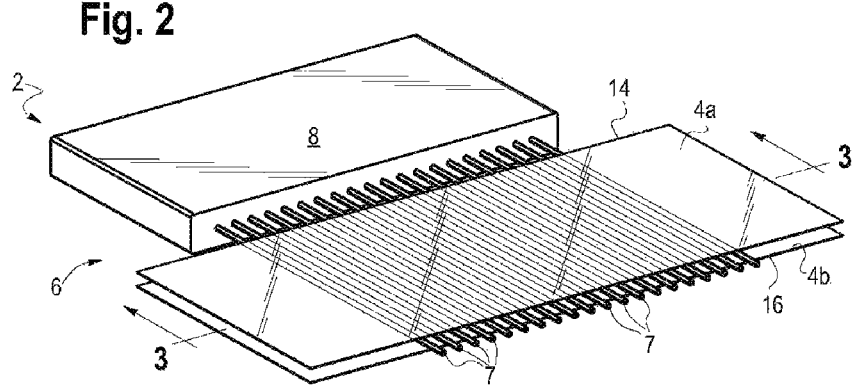
FIG. 2 is a perspective view of the capillary precursor element of FIG. 1.
Figure 3:
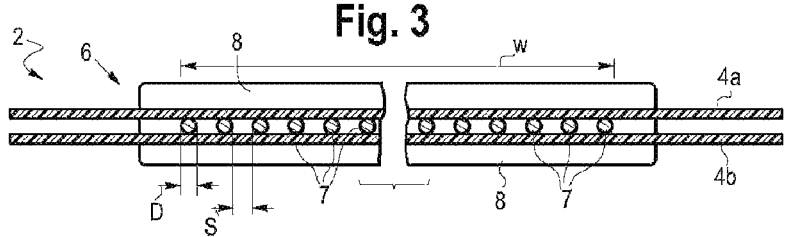
FIG. 3 is a cross sectional view of the capillary precursor element taken along line 3-3 of FIG. 2.
Figure 4:
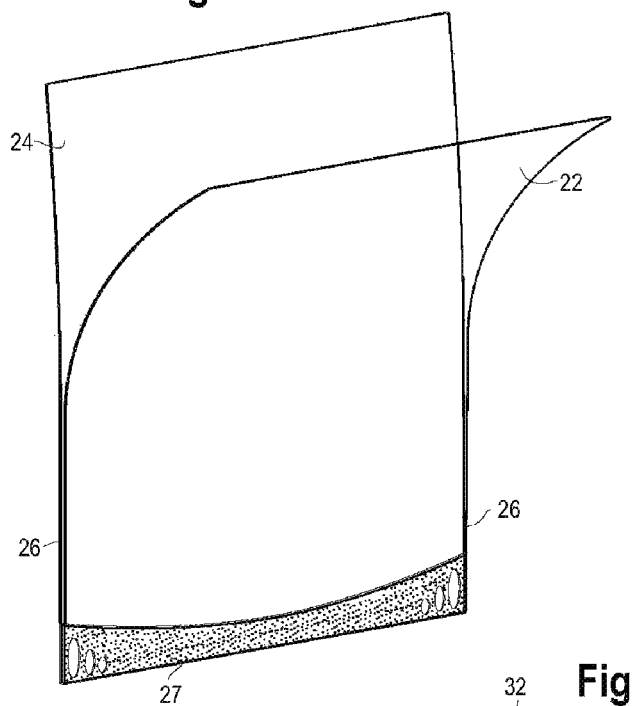
FIG. 4 is a perspective view of two flexible films in accordance with an embodiment of the present disclosure.

FIGS. 1-3 depict various views of a capillary precursor element 2 (or CPE 2). The CPE 2 is composed of two opposing polymeric strips (4a, 4b) of a polymeric material with an array 6 of pins 7 sandwiched therebetween. Polymeric strips 4a, 4b each may be a single layer strip or a multilayer strip (i.e., two, three, four, or more layers per polymeric strip).

Each polymeric strip 4a, 4b is composed of one or more polymeric materials. The composition of polymeric strip 4a may be the same or different than the composition of polymeric strip 4b. It is desired that the polymeric material has low shrink and release properties to enable easy removal of the pins. In addition, it is recognized that a factor in the retention and/or ease of discharge of the liquid product stored in the flexible container is the surface tension between (i) the channel (or capillary) surfaces and (ii) the liquid content of the flexible container. Applicant discovered that altering the surface tension, or otherwise optimizing surface tension, for a particular use may improve performance of the flexible pouch. Nonlimiting examples of suitable methods to alter surface tension include material selection of the polymer strips 4a, 4b; addition of surface coatings to the polymer strips 4a, 4b; surface treatment of the polymer strips and/or the formant channels 20 (i.e., corona treatment); and addition of additives, either to the polymer for the polymer strips 4a, 4b, or to the liquid to be stored in the flexible container.

Nonlimiting examples of suitable polymeric material for the polymeric strips 4a, 4b include propylene-based polymer, ethylene-based polymer, ethylene/α-olefin multi-block copolymer, and combinations thereof.

In an embodiment, each polymeric strip 4a, 4b is made from the same polymeric material. Nonlimiting examples of suitable polymeric materials for the polymeric strips 4a, 4b include ethylene/$C_3$-$C_{10}$ α-olefin copolymers linear or branched; ethylene/$C_4$-$C_{10}$ α-olefin copolymers linear or branched; propylene-based polymer (including plastomer and elastomer, random propylene copolymer, propylene homopolymer, and propylene impact copolymer); ethylene-based polymer (including plastomer and elastomer, high density polyethylene (HDPE); low density polyethylene (LDPE); linear low density polyethylene (LLDPE); medium density polyethylene (MDPE); ethylene-acrylic acid or ethylene-methacrylic acid and their ionomers with zinc, sodium, lithium, potassium, magnesium salts; ethylene-vinyl acetate (EVA) copolymers; and blends thereof.

In an embodiment, each polymeric strip 4a, 4b is made from the same polymeric material and the polymeric material is a propylene-based polymer having one, some, or all of the following properties:

(i) a density from 0.90 g/cc, or 0.905 g/cc to 0.91 g/cc;

(ii) a melt flow rate (MFR) from 0.5 g/10 min, or 1.0 g/10 min, or 1.5 g/10 min to 2.0 g/10 min, or 2.5 g/10 min; and/or (iii) a melt temperature, Tm, from 110° C., or 111° C. to 115° C.

A nonlimiting example of a suitable propylene-based polymer for the polymeric strips 4a, 4b includes PP H314-02Z (available from Braskem).

In an embodiment, each polymeric strip 4a, 4b is made from the same polymeric material and the polymeric material is an ethylene-based polymer having one, some, or all of the following properties:

(i) a density from 0.92 g/cc, or 0.93 g/cc, or 0.94 g/cc to 0.95 g/cc, or 0.96 g/cc;

(ii) a melt index (MI) from 0.5 g/10 min, or 0.85 g/10 min, or 1.0 g/10 min to 1.5 g/10 min, or 1.9 g/10 min, or 2.0 g/10 min; and/or (iii) a melt temperature, Tm, from 110° C., or 111° C., or 115° C. to 120° C., or 123° C., or 125° C.

Nonlimiting examples of suitable ethylene-based polymer for the polymeric strips 4a, 4b include ELITE™ 5100G, LDPE 501I, (available from The Dow Chemical Company) and DMDA-6400 NT7 (available from UNIVAL).

In an embodiment, each polymeric strip 4a, 4b is made from the same polymeric material and the polymeric material is an ethylene/α-olefin multi-block copolymer. The term "ethylene/α-olefin multi-block copolymer" includes ethylene and one or more copolymerizable α-olefin comonomer in polymerized form, characterized by multiple blocks or segments of two or more polymerized monomer units differing in chemical or physical properties.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the ethylene/α-olefin multi-block copolymer is an ethylene/$C_{4-12}$ α-olefin multi-block copolymer and has one, some, any combination of, or all the properties (i)-(x) below:

(i) a Mw/Mn from 1.7, or 1.8 to 2.2, or 2.5, or 3.5;
(ii) a melt temperature (Tm) from 80° C., or 85° C., or 90° C. to 95, or 99° C., or 100° C., or 105° C. to 110° C., or 115° C., or 120° C., or 125° C.;
(iii) a density from 0.86 g/cc, or 0.87 g/cc, or 0.88 g/cc to 0.89 g/cc;
(iv) 50-85 wt % soft segment and 40-15 wt % hard segment;
(v) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment;
(vi) from 0.5 mol %, or 1.0 mol %, or 2.0 mol %, or 3.0 mol % to 4.0 mol %, or 5 mol %, or 6 mol %, or 7 mol %, or 9 mol % octene in the hard segment;
(vii) a melt index (MI) from 1 g/10 min, or 2 g/10 min, or 5 g/10 min, or 7 g/10 min to 10 g/10 min to 15 g/10 min, or 20 g/10 min;
(viii) a Shore A hardness from 65, or 70, 71, or 72 to 73, or 74, or 75, or 77, or 79, or 80;
(ix) an elastic recovery (Re) from 50%, or 60% to 70%, or 80%, or 90%, at 300% 300% $min^{-1}$ deformation rate at 21° C. as measured in accordance with ASTM D 1708; and/or (x) a polydisperse distribution of blocks and a polydisperse distribution of block sizes.

In an embodiment, the ethylene/α-olefin multi-block copolymer is an ethylene/octene multi-block copolymer with one, some, or all properties (i)-(x) above.

In an embodiment, the ethylene/octene multi-block copolymer is sold under the Tradename INFUSE™, available from The Dow Chemical Company, Midland, Mich., USA. In a further embodiment, the ethylene/octene multi-block copolymer is INFUSE™ 9817.

In an embodiment, the ethylene/octene multi-block copolymer is INFUSE™ 9500.

In an embodiment, the ethylene/octene multi-block copolymer is INFUSE™ 9507.

In an embodiment, the ethylene/octene multi-block copolymer is INFUSE™ 9100.

The present ethylene/α-olefin multi-block copolymer may comprise two or more embodiments disclosed herein.

The array 6 includes a plurality of pins 7 and a support member 8. The pins 7 are arranged alongside and spaced-apart with respect to each other and extend from a first end 14 of the CPE 2 to a second end 16 of the CPE 2. Proximate ends of the pins 7 are supported, or otherwise held in place, with the support member 8. The support member 8 holds the pins 7 in a space-apart manner. The number of pins 7 may be varied as desired. Each pin 7 has a cross-sectional shape. Nonlimiting examples of suitable cross-sectional shapes for the pins include oval, ovoid, circle, curvilinear, triangle, square, rectangle, star, diamond, and combinations thereof.

As shown in FIGS. 1-2, the pins 7 are thin, elongated members. The pins 7 extend from the support member 8. The pins 7 (and the polymeric strips 4a, 4b) will form in an in situ microcapillary strip 10 with voids 12 and channels 20 as discussed in detail below. Nonlimiting examples of suitable materials for the pins 7 include, metal, wood, glass, and non-stick polymeric material such as Teflon, polycarbonate.

In an embodiment, the pins 7 are metal wires, such as stainless steel metal wires or nickel-titanium alloy wires, for example. The pins may or may not be coated with an anti-stick agent such as Teflon, nitride, ceramic, or silicon.

In an embodiment, distal ends of the pins 7 extend a distance from 5 millimeter (mm), or 10 mm, or 15 mm to 20 mm, or 25 mm from the support member 8.

The pins 7 have a diameter, D, as shown in FIG. 3. The term "diameter," as used herein, is the longest axis of the pin 7, from a cross-sectional view. In an embodiment, the diameter, D, is from 50 micrometers (μm), or 100 μm, or 150 μm, or 200 μm to 250 μm, or 300 μm, or 350 μm, or 400 μm, or 500 μm, or 750 μm, or 1000 μm.

In an embodiment, the diameter, D, is from 100 micrometers to 1000 micrometers.

The pins 7 may or may not be parallel with respect to each other. The term "parallel," as used herein, indicates the pins extend in the same direction and never intersect.

In an embodiment, the pins 7 are parallel, or are substantially parallel with respect to each other.

In an embodiment, the pins are not parallel (or divergent) with respect to each other.

The support member 8 holds the pins in place in a spaced-apart manner.

In an embodiment, as shown in FIGS. 1-2, the pins 7 are disposed perpendicular to, or substantially perpendicular to, the polymeric strips 4a, 4b. The polymeric strips 4a, 4b extend to, and beyond, the width, W, of the array 6 of pins 7. In other words, an excess amount of polymeric strip material is present on each side of the array 6 of pins 7. A spacing, S, is present between the pins 7, as shown in FIG.

3. In an embodiment, the spacing, S, is from 1 micrometer (μm), or 5 μm, or 10 μm, or 25 μm, or 50 μm, or 100 μm, or 150 μm, or 200 μm to 250 μm, or 300 μm, or 350 μm, or 400 μm, or 500 μm, or 1000 μm, or 1500 μm, or 2000 μm.

The array 6 of pins 7 has a width, W, as shown in FIG. 3. The length of the width, W, may vary based on the size and shape of the final flexible pouch to be produced.

In an embodiment, the width, W, is from 0.5 centimeter (cm), or 1.0 cm, or 1.5 cm, or 2.0 cm, or 2.5 cm, or 3.0 cm, or 5.0 cm to 8.0 cm, or 10.0 cm, or 20.0 cm, or 30.0 cm, or 40.0 cm, or 50.0 cm, or 60.0 cm, or 70.0 cm, or 80.0 cm, or 90.0 cm, or 100.0 cm.

In an embodiment, the CPE 2 has an array 6 of pins 7 having a width, W, from 30 mm to 40 mm.

2. Flexible Film

The present process includes placing the CPE 2 between two opposing flexible films 22, 24, as shown in FIGS. 4-6 and 15-17. Each flexible film can be a monolayer film or a multilayer film. The two opposing films may be components of a single (folded) sheet/web, or may be separate and distinct films. The composition and structure of each flexible film can be the same or can be different.

The CPE 2 can be placed between the two flexible films 22, 24 as a single unit (strip/array/strip or pre-formed strip). Alternatively, one polymeric strip (first polymeric strip) of the CPE 2 may be placed on one of the flexible films, with the array 6 subsequently placed on the first polymeric strip, and the other polymeric strip (second polymeric strip) placed on top of the array 6. Upon this configuration, the second flexible film may then be placed.

In an embodiment, the two opposing flexible films 22, 24 are components of the same sheet or film, wherein the sheet is folded upon itself to form the two opposing films. The three unconnected edges can then be sealed, or heat sealed, after the CPE 2 is placed between the folded-over films.

In an embodiment, each flexible film 22, 24 is a separate film and is a flexible multilayer film having at least one, or at least two, or at least three layers. The flexible multilayer film is resilient, flexible, deformable, and pliable. The structure and composition for each of the two flexible multilayer films 22, 24 may be the same or different. For example, each of the two flexible films 22, 24 can be made from a separate web, each web having a unique structure and/or unique composition, finish, or print. Alternatively, each of two flexible films 22, 24 can be the same structure and the same composition.

In an embodiment, flexible film 22 and flexible film 24 each is a flexible multilayer film having the same structure and the same composition.

Each flexible multilayer film 22, 24 may be (i) a coextruded multilayer structure, (ii) a laminate, or (iii) a combination of (i) and (ii). In an embodiment, each flexible multilayer film 22, 24 has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or ten, or eleven, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

The flexible multilayer film is composed of one or more polymeric materials.

Nonlimiting examples of suitable polymeric materials for the seal layer include olefin-based polymer including any ethylene/$C_3$-$C_{10}$ α-olefin copolymers linear or branched; ethylene/$C_4$-$C_{10}$ α-olefin copolymers linear or branched; propylene-based polymer (including plastomer and elastomer; and random propylene copolymer); ethylene-based polymer (including plastomer and elastomer, high density polyethylene (HDPE); low density polyethylene (LDPE); linear low density polyethylene (LLDPE); medium density polyethylene (MDPE)); ethylene-acrylic acid, ethylene vinyl acetate, or ethylene-methacrylic acid and their ionomers with zinc, sodium, lithium, potassium, magnesium salts; ethylene vinyl acetate (EVA) copolymers; and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VERSIFY™ or VISTAMAX™)), polyamides (such as Nylon 6; Nylon 6,6; Nylon 6,66; Nylon 6,12; Nylon 12; etc.), polyethylene norbornene, cyclic olefin copolymers, polyacrylonitrile, polyesters, copolyesters (such as polyethylene terephthlate glycol-modified (PETG)), cellulose esters, polyethylene and copolymers of ethylene (e.g., high density polyethylene (HDPE), LLDPE based on ethylene octene copolymer such as DOWLEX™, blends thereof, and multilayer combinations thereof.

Nonlimiting examples of suitable polymeric materials for the tie layer include functionalized ethylene-based polymers such as ethylene-vinyl acetate (EVA) copolymer; polymers with maleic anhydride-grafted to polyolefins such as any polyethylene, ethylene-copolymers, or polypropylene; and ethylene acrylate copolymers such an ethylene methyl acrylate (EMA); glycidyl containing ethylene copolymers; propylene- and ethylene-based olefin block copolymers such as INFUSE™ (ethylene-based Olefin Block Copolymers available from the Dow Chemical Company) and INTUNE™ (PP-based Olefin Block Copolymers available from The Dow Chemical Company); and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN™ resins available from The Dow Chemical Company); vinylethylene vinyl alcohol (EVOH) copolymer; and metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)); single-site LLDPE substantially linear, or linear ethylene alpha-olefin copolymers, including polymers sold under the trade name AFFINITY™ or ELITE™ (The Dow Chemical Company) for example; propylene-based plastomers or elastomers such as VERSIFY™ (The Dow Chemical Company); and blends thereof. An optional tie layer is selected from either ethylene-based olefin block copolymer INFUSE™ Olefin Block Copolymer (available from The Dow Chemical Company) or propylene-based olefin block copolymer such as INTUNE™ (available from The Dow Chemical Company), and blends thereof. The outer layer includes greater than 50 wt % of resin(s) having a melting point, Tm, that is from 25° C. to 30° C., or 40° C. higher than the melting point of the polymer in the seal layer wherein the outer layer polymer is selected from resins such as VERSIFY™, VISTAMAX™, ELITE™, HDPE, or a propylene-based polymer such as propylene homopolymer, propylene impact copolymer, or TPO.

In an embodiment, the flexible multilayer film is co-extruded.

In an embodiment, flexible multilayer film includes a seal layer selected from LLDPE (sold under the trade name DOWLEX™ (The Dow Chemical Company)); single-site LLDPE (substantially linear, or linear, olefin polymers, including polymers sold under the trade name AFFINITY™ or ELITE™ (The Dow Chemical Company) for example; propylene-based plastomers or elastomers such as VERSIFY™ (The Dow Chemical Company); and blends thereof. The flexible multilayer film also includes an outer layer that is a polyamide.

In an embodiment, the flexible multilayer film is a coextruded film and includes:

(i) a seal layer composed of an olefin-based polymer having a first melt temperature less than 105° C., (Tm1); and (ii) an outer layer composed of a polymeric material having a second melt temperature, (Tm2), wherein Tm2-Tm1>40° C.

The term "Tm2–Tm1" is the difference between the melt temperature of the polymer in the outer layer and the melt temperature of the polymer in the seal layer, and is also referred to as "ΔTm." In an embodiment, the ΔTm is from 41° C., or 50° C., or 75° C., or 100° C. to 125° C., or 150° C., or 175° C., or 200° C.

In an embodiment, the flexible multilayer film is a coextruded film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cc, or from 0.875 to 0.910 g/cc, or from 0.888 to 0.900 g/cc and the outer layer is composed of a polyamide having a Tm from 170° C. to 270° C.

In an embodiment, the flexible multilayer film is a coextruded and/or laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cc, or from 0.875 to 0.910 g/cc, or from 0.888 to 0.900 g/cc and an outermost layer composed of a material selected from LLDPE, OPET, OPP (oriented polypropylene), BOPP, polyamide, and combinations thereof.

In an embodiment, the flexible multilayer film is a coextruded and/or laminated film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cc, or from 0.875 to 0.910 g/cc, or from 0.888 to 0.900 g/cc. The outer layer is composed of a material selected from LLDPE, OPET, OPP (oriented polypropylene), BOPP, polyamide, and combinations thereof.

In an embodiment, the flexible multilayer film is a coextruded (or laminated) five layer film, or a coextruded (or laminated) seven layer film having at least two layers containing an ethylene-based polymer. The ethylene-based polymer may be the same or different in each layer.

In an embodiment, the flexible multilayer film includes a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a heat seal initiation temperature (HSIT) from 65° C. to less than 125° C. Applicant discovered that the seal layer with an ethylene-based polymer with a HSIT from 65° C. to less than 125° C. advantageously enables the formation of secure seals and secure sealed edges around the complex perimeter of the flexible container. The ethylene-based polymer with HSIT from 65° C. to 125° C. enables lower heat sealing pressure/temperature during container fabrication. Lower heat seal pressure/temperature results in lower stress at the fold points of the gusset, and lower stress at the union of the films in the top segment and in the bottom segment. This improves film integrity by reducing wrinkling during the container fabrication. Reducing stresses at the folds and seams improves the finished container mechanical performance. The low HSIT ethylene-based polymer seals at a temperature below what would cause the in situ microcapillary strip dimensional stability to be compromised.

In an embodiment, the flexible multilayer film is a coextruded and/or laminated five layer, or a coextruded (or laminated) seven layer film having at least one layer containing a material selected from LLDPE, OPET, OPP (oriented polypropylene), BOPP, and polyamide.

In an embodiment, the flexible multilayer film is a coextruded and/or laminated five layer, or a coextruded (or laminated) seven layer film having at least one layer containing OPET or OPP.

In an embodiment, the flexible multilayer film is a coextruded (or laminated) five layer, or a coextruded (or laminated) seven layer film having at least one layer containing polyamide.

In an embodiment, the flexible multilayer film is a seven-layer coextruded (or laminated) film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 106° C. The outer layer is a polyamide having a Tm from 170° C. to 270° C. The film has a ΔTm from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

In an embodiment, flexible films 22, 24 each has a thickness from 50 micrometers (μm), or 75 μm, or 100 μm, or 150 μm, or 200 μm to 250 μm, or 300 μm, or 350 μm, or 400 μm.

3. Placing and Positioning the CPE

The opposing flexible films 22 and 24 are superimposed on each other and form a common peripheral edge 26, as shown in FIGS. 4-21. The common peripheral edge 26 defines a shape. The shape can be a polygon (such as triangle, square, rectangle, diamond, pentagon, hexagon, heptagon, octagon, etc.) or an ellipse (such as an ovoid, an oval, or a circle).

Figure 5:
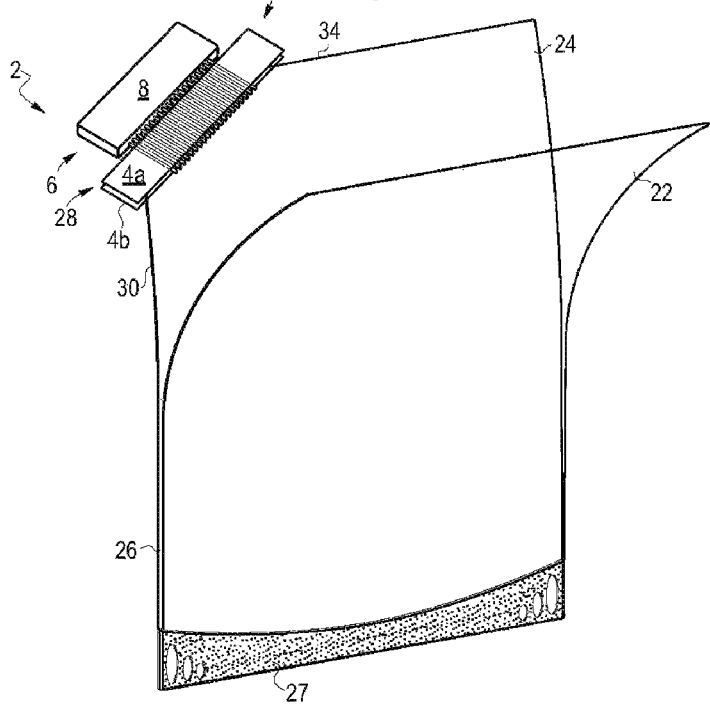
FIG. 5 is a perspective view of the capillary precursor element placed between two flexible films in accordance with an embodiment of the present disclosure.

The present process includes placing the CPE 2 between the two opposing flexible films 22, 24, as shown in FIG. 5 (and in FIG. 16). The flexible films 22, 24 may or may not be sealed prior to the placing step.

In an embodiment, a bottom seal 27 attaches the first flexible film 22 to the second flexible film 24 prior to the placing step.

In an embodiment, a pouch is partially formed prior to the placing step and includes a bottom gusset to form a stand up pouch.

4. Positioning the CPE

The process includes positioning a first side of the CPE 2 at a first side of the common peripheral edge and positioning a second side of the CPE 2 at a second side of the common peripheral edge.

In an embodiment, the common peripheral edge 26 defines a polygon, such as a 4-sided polygon (rectangle, square, diamond), as shown in FIG. 5. In this embodiment, the process includes first positioning a first side 28 of the CPE 2 at a first side 30 of the 4-sided polygon. The process includes second positioning a second side 32 of the CPE 2 at an intersecting second side 34 of the 4-sided polygon. As shown in FIGS. 5-6, the second side 34 of the 4-sided polygon intersects the first side 30 of the 4-sided polygon, the intersection being corner 36 shown in FIGS. 6 and 7.

The polymer strips 4a, 4b have an outer edge 40 (corresponding to first end 14) and an inner edge 42 (corresponding to second end 16). In an embodiment, the outer edge 40 forms angle A at the corner 36, as shown in FIGS. 6 and 7. In a further embodiment, angle A is 45°.

Figure 17:
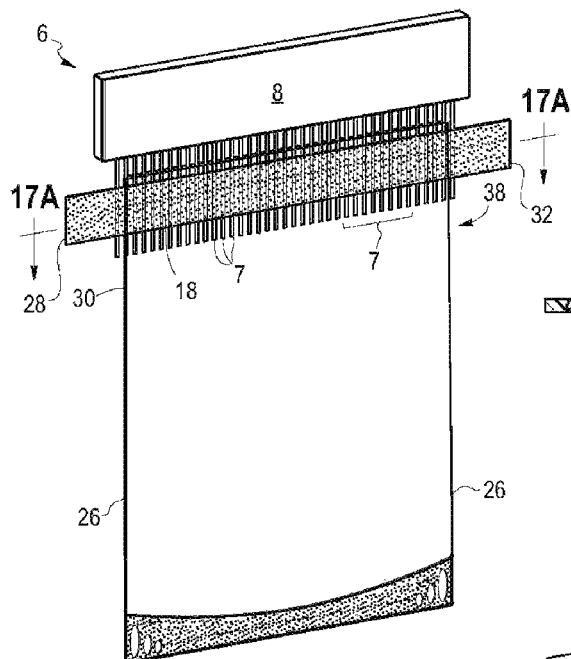
FIG. 17 is a perspective view of a capillary precursor element sealed between two flexible films in accordance with an embodiment of the present disclosure.
Figure 18A:
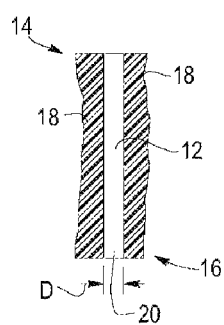
FIG. 18A is a sectional view of area 18A of FIG. 18.
Figure 18:
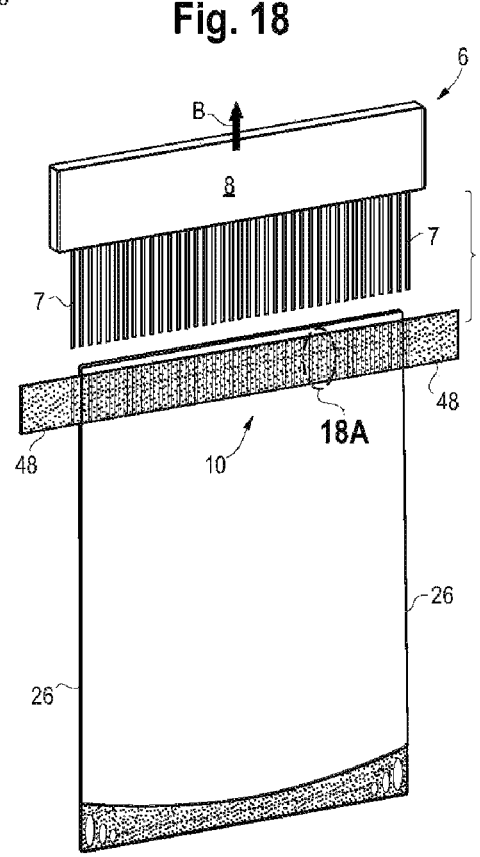
FIG. 18 is a perspective view of the removal of the array of pins from the polymeric matrix in accordance with an embodiment of the present disclosure.

In an embodiment shown in FIGS. 16-18, the common peripheral edge 26 defines a polygon, such as a 4-sided polygon (rectangle, square, diamond). In this embodiment, the process includes first positioning a first side 28 of the CPE 2 at a first side 30 of the 4-sided polygon. The process includes second positioning a second side 32 of the CPE 2 at a parallel second side 38 of the 4-sided polygon. As shown in FIGS. 15-17, the first side 30 of the 4-sided polygon is parallel to, and does not intersect, the second side 38 of the 4-sided polygon.

The array of pins may or may not extend along the entire length of one side of the polygon. FIG. 16 shows the array of pins extending across the entire length of a side of the flexible pouch. In an alternate embodiment, the array of pins extends along only a portion of the length of one side of the polygon.

FIG. 6A (and FIG. 16A) is a cross-sectional view showing the arrangement of the components after the positioning step and prior to the first sealing step. The polymer strip 4b is disposed upon, and is in direct contact with, the flexible film 24. The array 6 of pins 7 is disposed upon, and is in direct contact with the polymer strip 4b. The polymer strip 4a is disposed upon, and is in direct contact with the array 6 of pins 7. The flexible film 22 is disposed upon, and in direct contact with the polymer strip 4a.

5. Sealing

The process includes first sealing, at a first seal condition, the CPE 2 between the two flexible films 22, 24. The first sealing procedure forms a hermetic seal between the CPE 2 and each flexible film 22, 24.

The first sealing can be an ultrasonic seal procedure, a heat seal procedure, and combinations thereof.

In an embodiment, the first sealing is a heat sealing procedure. The term "heat sealing," as used herein, is the act of placing two or more films of polymeric material between opposing heat seal bars, the heat seal bars moved toward each other, sandwiching the films, to apply heat and pressure to the films such that opposing interior surfaces (seal layers) of the films contact, melt, and form a heat seal, or weld, to attach the films to each other. Heat sealing includes suitable structure and mechanism to move the seal bars toward and away from each other in order to perform the heat sealing procedure.

The first sealing occurs at a first seal condition. The first seal condition is sufficient: (i) to fuse polymeric material 4a to polymeric material 4b, and (ii) to form a hermetic seal of this fused structure to flexible films 22 and 24.

In an embodiment, the first heat seal condition includes a heat seal temperature that (1) is greater than the melting temperature, Tm, of the polymeric material in the polymeric strips 4a, 4b and (2) is less than the heat seal initiation temperature seal layer for flexible films 22, 24. In addition, the first sealing utilizes a sealing pressure sufficient to force the polymeric material of strips 4a, 4b into the spaces, S, between the pins 7. During the first sealing the polymeric material of strips 4a, 4b is flowable and fuses together to form a matrix 18. Matrix 18 is a fusion of the polymeric material from strips 4a, 4b.

Figure 17A:
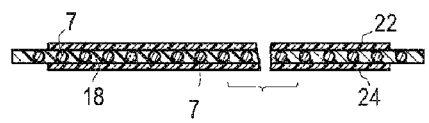
FIG. 17A is a sectional view taken along line 17A-17A of FIG. 17.

FIG. 7A and FIG. 17A each is a cross-sectional view of the CPE 2 and the flexible films 22, 24 after completion of the first sealing step. The polymeric material for strips 4a, 4b is fused as matrix 18. Matrix 18 completely surrounds and encapsulates the pins 7. The matrix 18 is heat sealed to, or otherwise welded to, flexible film 22 and flexible film 24.

In an embodiment, the polymeric strips 4a, 4b can be sealed to each other prior to sealing the CPE 2 between the flexible films. The polymeric strips 4a, 4b each may include multilayers with (i) a lower Tm inner layer in contact with the pins 7, and (ii) a higher Tm outer layer for sealing with pouch flexible films. In this way, the channels 20 can be pre-formed (pre-formed strip) prior to placement of the CPE 2 between the two flexible films. This pre-formed strip can then be moved into position for sealing into the pouch using a temperature above the melt temperature of the polymeric material in the sealant layer of the flexible films. The pins 7 remain in the CPE 2 until the CPE 2 is heat sealed to the pouch. The pins 7 are subsequently removed before the pouch peripheral seal is made.

6. Removal of Array

The process includes removing the array of pins from the matrix to form an in situ microcapillary strip.

In an embodiment, the matrix 18 is allowed to cool and the array 6 is subsequently pulled or otherwise withdrawn from the matrix, as shown by arrow B in FIGS. 8 and 18. The removal step can be performed from 0.1 second up to about 1 minute, after completion of the first sealing step.

The removal step includes grasping the support member 8, and withdrawing, or otherwise pulling (as shown by arrow B, FIGS. 8 and 18), the support member 8 away from the matrix 18, thereby separating, or otherwise removing, the pins 7 from the matrix 18. Removal of the pins 7, forms an in situ microcapillary strip 10. The in situ microcapillary strip 10 includes voids 12 formed upon exit of the pins 7 from the matrix 18. The voids 12 form channels 20 as shown in FIGS. 9B and 18A. Applicant discovered that removal of the pins 7 does not cause damage to the pouch and yields integral and well-formed channels 20 that maintain their shape and structure when the pins 7 are removed.

In an embodiment, the removal step includes a sequenced removal of one pin at a time to allow lower extraction forces.

In an embodiment, the diameter for channels 20 is D (the same diameter, D, as for the diameter of the pins 7), as shown in FIG. 9B; and the spacing between the channels 20 is S (the same length S, the distance between the pins 7).

The in situ microcapillary strip 10 is composed of the matrix 18 and a plurality of channels 20. One or more channels 20 are disposed in the matrix 18. The channels 20 are arranged alongside and extend from the first end 14 to the second end 16 of the in situ microcapillary strip 10, as shown in FIGS. 9B and 18A. The number of channels 20 may be varied as desired. Each channel 20 has a cross-sectional shape corresponding to the cross-sectional shape of the pin 7 forming the channel.

The in situ microcapillary strip 10 has a thickness, T, and a width, $W_S$, as shown in FIG. 9A. In an embodiment, the thickness, T, is from 50 μm, or 60 μm, or 70 μm, or 80 μm, or 90 μm, or 100 μm to 200 μm, or 500 μm, or 1000 μm, or 1500 μm, or 2000 μm.

In an embodiment, the channel 20 diameter, D, is from 20%, or 30% to 40%, or 50%, or 60%, or 70%, or 80%, or 90%, or 95% of the thickness, T.

In an embodiment, the in situ microcapillary strip has a thickness, T, from 200 μm to 800 μm.

In an embodiment, the channels 20 have a diameter, D, from 200 μm to 500 μm; the matrix 18 has a spacing, S, from 500 μm to 1500 μm; and the in situ microcapillary strip 10 has a thickness, T, from 200 μm to 600 μm, and a width, $W_S$, from 20 mm to 40 mm.

7. Second Sealing

The process includes second sealing, at a second seal condition, a peripheral seal along at least a portion of the common peripheral edge. The second sealing can be an ultrasonic seal procedure, an adhesive seal procedure, a heat seal procedure, and combinations thereof.

In an embodiment, the second sealing is a heat sealing procedure. The second sealing is performed at a second seal condition. The second seal condition includes (1) a heat seal temperature that is greater than or equal to the Tm of the polymeric material of matrix 18 and (2) a seal pressure that collapses or otherwise crushes a portion of the channels 20 of the in situ microcapillary strip 10.

Figure 13:
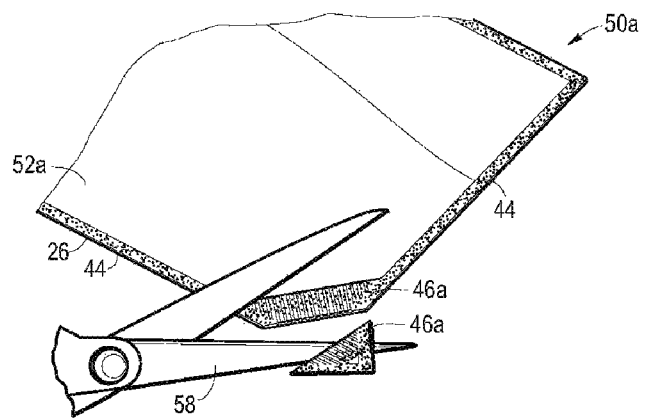
FIG. 13 is a perspective view of the removal of the sealed microcapillary segment in accordance with an embodiment of the present disclosure.
Figure 14:
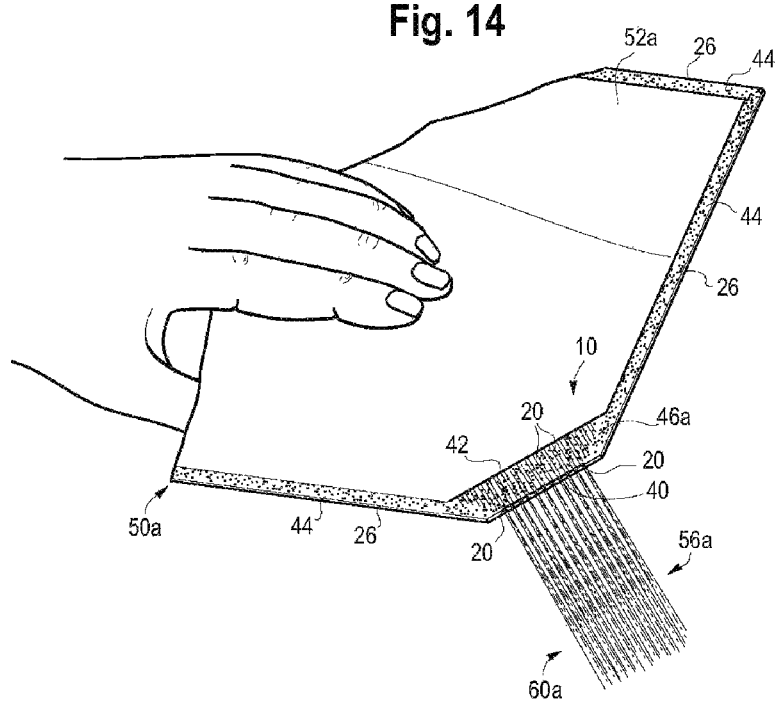
FIG. 14 a perspective view of a dispensing step in accordance with an embodiment of the present disclosure.
Figure 14A:
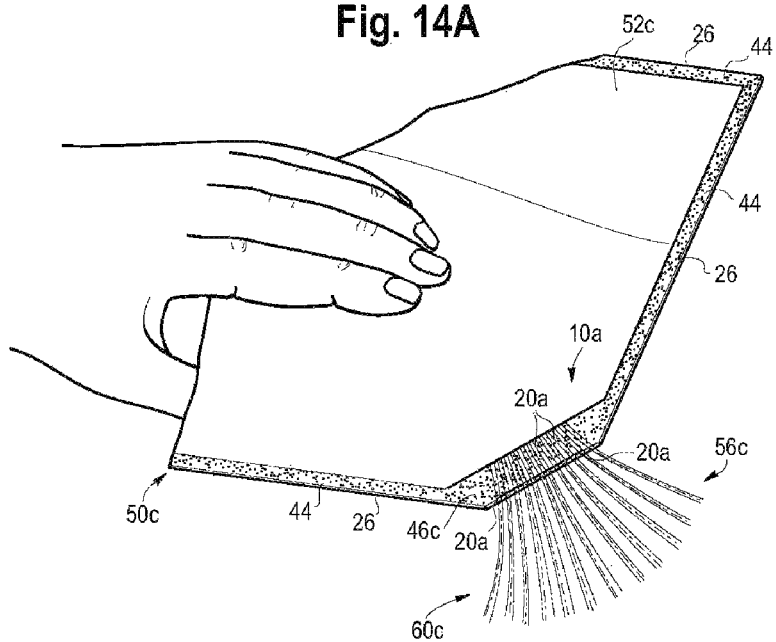
FIG. 14A a perspective view of a dispensing step in accordance with an embodiment of the present disclosure.

In an embodiment, the second sealing is a heat sealing procedure and includes sealing, or otherwise forming, a peripheral seal 44 along at least a portion of the common peripheral edge 26. The resultant peripheral seal 44 includes a sealed microcapillary segment 46a (FIGS. 10-14), 46b (FIGS. 19, 19A, 20), or 46c (FIG. 14A). The second sealing is performed at a temperature from 120° C. to 250° C., a sealing pressure from 20 N/cm² to 250 N/cm², and a dwell time between 0.1 seconds (s) to 2.0 s, or more.

FIGS. 10 and 10A (and FIGS. 19, 19A) show the first film(22)/strip(10)/second film(24) after completion of the second sealing step. In FIGS. 10 and 10A, the sealed microcapillary segment 46a includes a change in the structure of the in situ microcapillary strip 10 whereby the matrix 18 is melted and sealed to flexible films 22, 24 and the channels 20 are crushed, or otherwise collapsed. In FIGS. 19 and 19A, the sealed microcapillary segment 46b is melted matrix 18, sealed to flexible films 22, 24 and the channels 20 are crushed and collapsed, as described for sealed microcapillary segment 46a. In this way, the sealed microcapillary segment 46a (and 46b, 46c) forms a closed and hermetic seal. The peripheral seal 44, includes the sealed microcapillary segments 46a, 46b, 46c, for a hermetic seal around the perimeter of the films 22, 24.

FIG. 8A shows an embodiment wherein a capillary precursor element 2a (CPE 2a) includes an array 6a of non-parallel (or divergent) pins 7a and a support member 8a. The first sealing step and the second sealing are performed as previously disclosed herein. The pins 7a can be made of a material that is spring-like so that if a pin 7a is bent, the pin 7a will pull out and still retain the original shape of the pin. FIG. 8A shows removal (arrow B) of the CPE 2a after completion of the second sealing step.

In an embodiment, the removal step includes a sequenced removal of one pin 7a at a time to allow lower extraction forces.

Excess polymeric strip material 48 (FIGS. 8A, 10, and 18) that does not form part of the sealed microcapillary segment is removed.

8. Flexible Pouch

The second sealing forms a pouch 50a (FIGS. 1-14), a pouch 50b (FIGS. 19-21), and a pouch 50c (FIG. 14A) having respective storage compartment 52a, 52b, 52c. As the first film 22 and the second film 24 are flexible, so too is each pouch 50a, 50b, 50c a flexible pouch.

In an embodiment, a portion of the common peripheral edge 26 remains unsealed after the second seal step. This unsealed area forms a fill inlet 54, as shown in FIGS. 10 and 11. The process includes filling pouch 50a, at the fill inlet 54, a liquid 56a (for pouch 50a), into the storage compartment 52a. The pouch 50b can be filled with a liquid 56b, and the pouch 50c can be filled with a liquid 56c in a similar manner. Nonlimiting examples of suitable liquids 56a, 56b, 56c include fluid comestibles (beverages, condiments, salad dressings, flowable food); liquid or fluid medicaments; aqueous plant nutrition; household and industrial cleaning fluids; disinfectants; moisturizers; lubricants; surface treatment fluids such as wax emulsions, polishers, floor and wood finishes; personal care liquids (such as oils, creams, lotions, gels); etc.

In an embodiment, the process includes third sealing the fill inlet 54, to form a peripheral seal 44, at the fill inlet 54. The third sealing step forms a closed and filled pouch 50a, 50b, 50c. In an embodiment, the third seal procedure is a heat seal procedure and utilizes heat seal conditions to form a hermetic seal at the fill inlet 44.

The third sealing can be an ultrasonic seal procedure, an adhesive seal procedure, a heat seal procedure, and combinations thereof.

In an embodiment, the third sealing is a heat sealing procedure. The heat seal conditions for the third sealing procedure can be the same as, or different than the first seal condition, or the second heat seal condition.

9. Dispensing

In an embodiment, the process includes removing at least a portion of the sealed microcapillary segment 46a (for pouch 50*a*), a portion of the sealed microcapillary segment 46*b* (for pouch 50*b*), or a portion of the sealed microcapillary segment 46*c* (for pouch 50*c*), to expose the outer edge of the channels 20. FIGS. 13 and 20 show the removal of respective portions of the sealed microcapillary segment 46*a* (FIG. 13) and 46*b* (FIG. 20). Removal can occur manually or by way of machine. In an embodiment, the removing step is performed manually (by hand such as by tearing), with a person cutting the sealed microcapillary segment 46*a*, 46*b* with a sharp object such as a blade, a knife, or a scissors 58, as shown in FIGS. 13 and 20.

Removal of the sealed microcapillary segment 46*a*, 46*b*, 46*c* exposes the outer edge of the in situ microcapillary strip 10 to the external environment. Once the sealed microcapillary segment 46*a*, 46*b*, 46*c* is removed from its respective pouch 50*a*, 50*b*, 50*c*, the exposed channels 20 place the interior of storage compartments 52*a*, 52*b*, 52*c* in fluid communication with exterior of respective pouch 50*a*, 50*b*, 50*c*.

In an embodiment, the process includes squeezing the storage compartment 52*a* and dispensing a spray pattern 60*a* of the liquid 56*a*. The spray pattern 60*a* can be advantageously controlled by adjusting the amount of squeeze force imparted upon the storage compartment 52*a*. In this way, the flexible pouch 50*a* surprisingly delivers a controlled spray pattern of liquid 56*a* without the need for a rigid spray component. The profile of spray 60*a* can be designed by the configuration of CPE 2 and the resultant in situ microcapillary strip 10. Channels 20 with a relatively smaller diameter D will dispense a fine spray of the liquid 56*a* when compared to channels 20 with a relatively larger diameter D. FIG. 14 shows the dispensing of a low viscosity liquid 56*a* (such as a water-based liquid) as a fine and controlled spray 60*a*.

Figure 21:
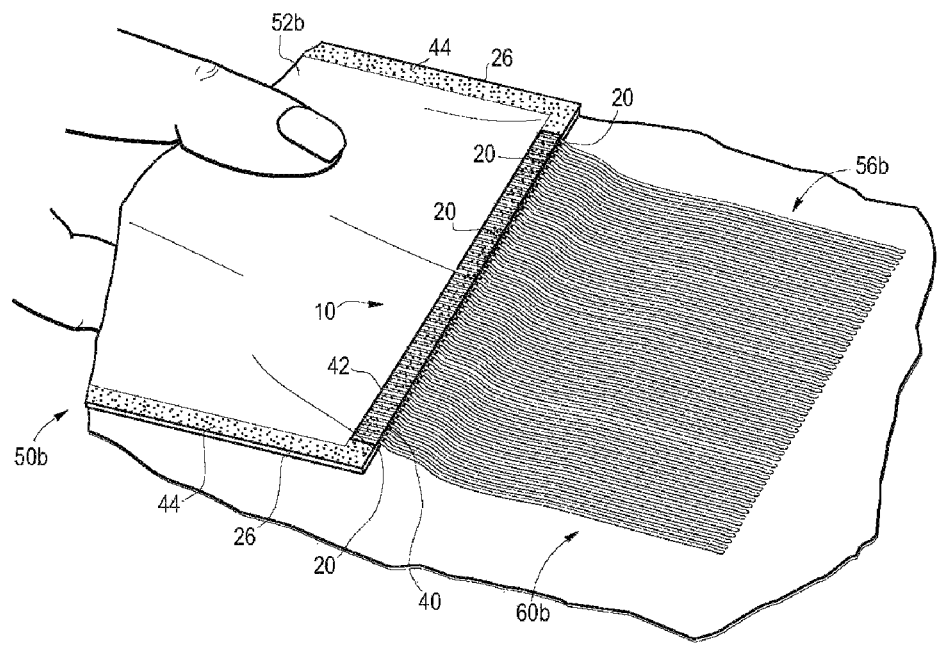
FIG. 21 a perspective view of a dispensing step in accordance with an embodiment of the present disclosure.
Figure 22:
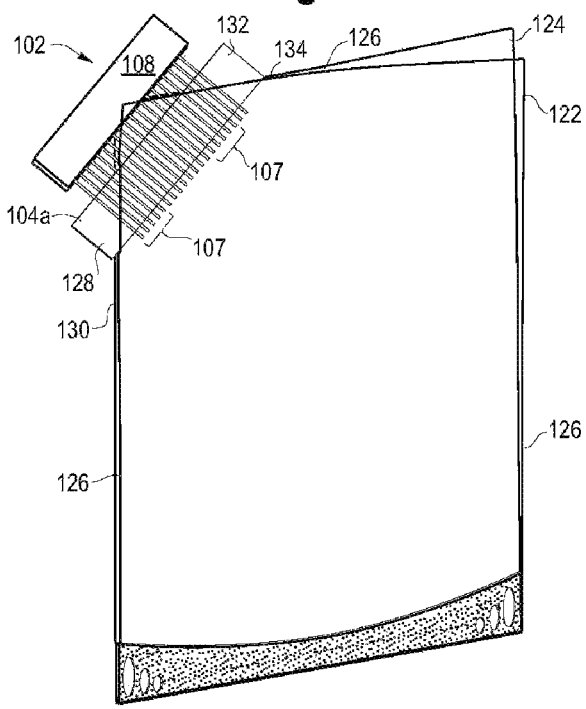
FIG. 22 is a perspective view of a capillary precursor element placed at an edge offset distance between two flexible films in accordance with an embodiment of the present disclosure.

In an embodiment, the process includes squeezing the storage compartment 52*b* of pouch 50*b* and dispensing a pattern 60*b* of the liquid 56*b*, as shown in FIG. 21. The pattern 60*b* can be advantageously controlled by adjusting the amount of squeeze force imparted upon the storage compartment 52*b*. In this way, the flexible pouch 50*b* surprisingly delivers a controlled application of liquid 56*b* without the need for a rigid spray component. The diameter D of the channels 20 are configured so the profile of spray 60*b* delivers, or otherwise dispenses, a smooth and even application of a viscous liquid 56*b*, such as a high viscosity liquid, a lotion or a cream, onto a surface, such as a person's skin, as shown in FIG. 21.

In an embodiment, the process includes squeezing the storage compartment 52*c* of pouch 50*c* and dispensing a fan spray pattern 60*c* of the liquid 56*c*, as shown in FIG. 14A. The pouch 50*c* includes an in situ microcapillary strip 10*a* made with non-parallel pins 7*a* as shown in FIG. 8A. The spray pattern 60*c* can be advantageously controlled by adjusting the amount of squeeze force imparted upon the storage compartment 52*c*. In this way, the flexible pouch 50*c* surprisingly delivers a controlled application of liquid 56*c* without the need for a rigid spray component. The non-parallel channels 20*a* are configured so the profile of fan spray 60*c* delivers a disperse, or otherwise wide area spray pattern, when compared to the spray 60*a*, for example.

The present disclosure provides another process. In an embodiment, a process for producing a flexible pouch is provided and includes placing a capillary precursor element (CPE) at an edge offset distance between two opposing flexible films. The opposing flexible films define a common peripheral edge. The CPE comprises an array of pins sandwiched between two opposing polymeric strips. The process includes positioning a first side of the CPE at a first side of the common peripheral edge and positioning a second side of the CPE at a second side of the common peripheral edge. The process includes first sealing, at a first seal condition, (i) the opposing polymeric strips to each other to form a matrix, and (ii) sealing the matrix to the two opposing flexible films. The process includes removing the array from the matrix to form an in situ microcapillary strip.

10. Edge Offset Distance

The process includes placing a CPE 102 at an edge offset distance between two opposing flexible films 122, 124, as shown in FIGS. 22-31. CPE 102 may be any capillary precursor element as previously described herein. Films 122, 124 may by any flexible film as previously disclosed herein. Polymeric strips 104*a*, 104*b* may be any polymeric strips as previously disclosed herein. The edge offset distance, or EOD, is a length from the common peripheral edge 126 to an interior portion of the flexible films 122, 124. The edge offset distance, EOD, can be from zero, or greater than zero, or 1 millimeter (mm), or 1.5 mm, or 2.0 mm, or 2.5 mm, or 3.0 mm, or 3.5 mm to 4.0 mm, or 4.5 mm, or 5.0 mm, or 6.0 mm, or 7.0 mm, or 9.0 mm, or 10.0 mm, or 15.0 mm, or 20.0 mm or 30 mm.

FIGS. 22-27 show an embodiment, wherein the polymeric strips 104*a*, 104*b* of the CPE 102 are placed at an edge offset distance, EOD, between opposing flexible films 122, 124, and the flexible films define a common peripheral edge 126. The distance from the corner 136 to the outer edge 140 is the EOD, shown as length EOD in FIGS. 23, 25 and 29, and is from 0 mm, or greater than 0 mm, or 1 mm, or 5 mm, 10 mm, or 15 mm to 20 mm, or 25 mm to 30 mm.

A first side of the CPE 102 is positioned at a first side of the common peripheral edge and a second side of the CPE 102 is positioned at a second side of the common peripheral edge. The common peripheral edge 126 defines a 4-sided polygon (rectangle, square, diamond). The process includes first positioning a first side 128 of the CPE 102 at a first side 130 of the 4-sided polygon. The process includes second positioning a second side 132 of the CPE 102 at an intersecting second side 134 of the 4-sided polygon. As shown in FIGS. 22-25, the second side 134 of the 4-sided polygon intersects the first side 130 of the 4-sided polygon, the intersection being corner 136.

Figure 23:
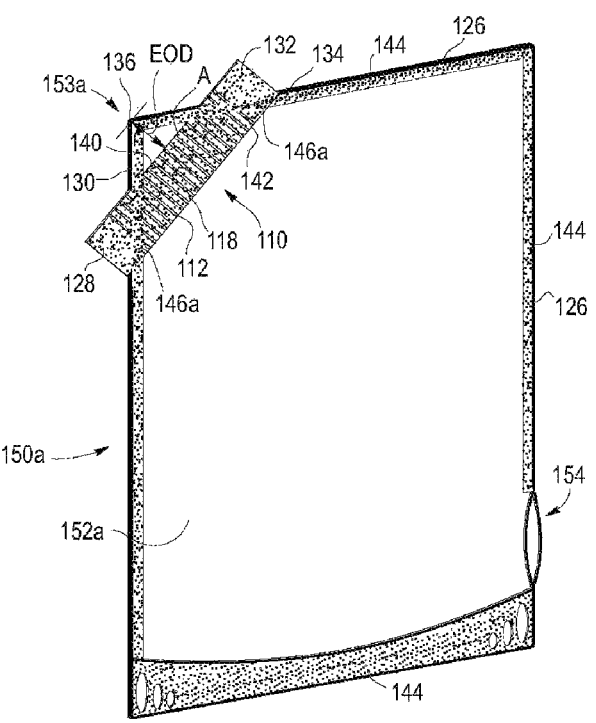
FIG. 23 is a perspective view of an in situ microcapillary strip sealed between two flexible films in accordance with an embodiment of the present disclosure.
Figure 24:
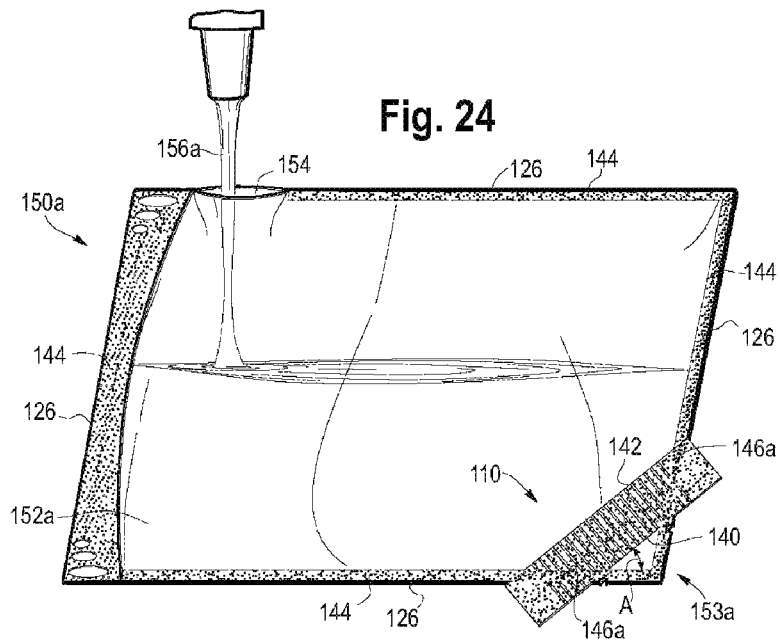
FIG. 24 is a perspective view of a filling step in accordance with an embodiment of the present disclosure.
Figure 25:
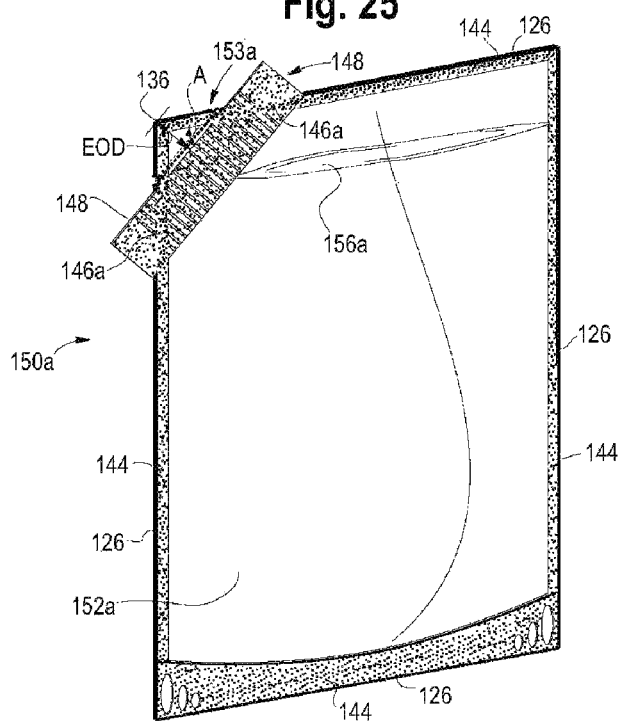
FIG. 25 is a perspective view of a filled and sealed flexible pouch in accordance with an embodiment of the present disclosure.

The polymeric strips 104*a*, 104*b* have an outer edge 140 and an inner edge 142. In an embodiment, the outer edge 140 forms angle A at the corner 136, as shown in FIGS. 23-25. In a further embodiment, angle A is 45°.

FIGS. 28-31 show another embodiment, wherein the CPE 102 is placed at an edge offset distance, EOD. From the top common peripheral edge 126, to the outer edge 140, the EOD is from zero, or greater than zero, or 1 millimeter (mm), or 1.5 mm, or 2.0 mm, or 2.5 mm, or 3.0 mm, or 3.5 mm to 4.0 mm, or 4.5 mm, or 5.0 mm, or 6.0 mm, or 7.0 mm, or 9.0 mm, or 10.0 mm, or 15.0 mm, or 20.0 mm.

The process includes first positioning a first side 128 of the CPE 102 at a first side 130 of the 4-sided polygon. The process includes second positioning a second side 132 of the CPE 102 at a parallel second side 138 of the 4-sided polygon. As shown in FIGS. 28 and 29, the first side 130 of the 4-sided polygon is parallel to, and does not intersect, the second side 138 of the 4-sided polygon.

11. Sealing

The process includes first sealing, at a first seal condition, the CPE 102 between the two flexible films 122, 124. The first sealing procedure fuses the polymeric strips 104*a*, 104*b* to form the matrix 118 and also forms a hermetic seal between matrix 118 and each flexible film 122, 124 as previously discussed.

The first sealing can be any first sealing procedure at first seal conditions as previously disclosed herein.

The process includes removing the array 106 of pins 107 from the matrix to form an in situ microcapillary strip 110. The array 106 includes a plurality of pins 107 and a support member 108. The removal of the array 106 may occur as previously discussed herein. The removal step removes the pins 107 from the matrix 118 and forms voids 112 and channels 120 in the matrix 118 of the in situ microcapillary strip 110 as previously disclosed.

The process includes second sealing, at a second seal condition, a peripheral seal 144 along at least a portion of the common peripheral edge 126. The resultant peripheral seal 144 includes a sealed microcapillary segment 146a, for FIGS. 23-25 (and sealed microcapillary segment 146b for FIGS. 29-31). The second sealing can be any second sealing procedure with any second sealing condition as previously disclosed herein.

In an embodiment, the process includes forming, with the second sealing, a flexible pouch 150a or 150b having a respective storage compartment 152a, 152b and a respective pocket 153a, 153b. The in situ microcapillary strip 110 separates the storage compartment from the pocket.

In an embodiment, the flexible pouch includes a fill inlet 154 at an unsealed portion of the common peripheral edge 126. FIG. 24 shows the process of filling a liquid 156a through the fill inlet 154 and into the storage compartment 152a. Storage compartment 152b (for flexible pouch 150b FIGS. 29-31) can be filled with a liquid 156b in a similar manner.

In an embodiment, the process includes third sealing the fill inlet 154 and forming a closed and filled flexible pouch. The third sealing can include any third sealing procedure as previously disclosed herein.

Excess polymeric strip material 148 (FIG. 25) that does not form part of the sealed microcapillary segment is removed.

In an embodiment, the process includes removing the pocket to expose the outer edge of the channels 120. Once the pocket is removed from the pouch, the exposed channels 120 of the in situ microcapillary strip 110 place the interior of the storage compartment in fluid communication with exterior of the pouch.

FIGS. 23-27 show an embodiment wherein pouch 150a includes a corner pocket 153a. Cut-outs (or notches) 155a in the peripheral seal 144 enable ready removal of the corner pocket 153a. In an embodiment, the removing step includes tearing, by hand, the corner pocket 153a from the pouch 150a.

FIGS. 29-31 show another embodiment wherein pouch 150b includes a long pocket 153b. Cut-outs (or notches) 155b in the peripheral seal 144 enable ready removal of the long pocket 153b. In an embodiment, the process includes tearing, by hand, the long pocket 153b from the pouch 150b.

Alternatively, the removing of the pocket (either 153a, or 153b) can be accomplished with sharp object such as a blade, a knife, or a scissors.

Once the pocket is removed from the pouch, an embodiment includes squeezing the storage compartment and dispensing, through the channels, the liquid from the pouch.

The process includes squeezing the storage compartment to dispense the liquid through the exposed channels 120 and out of the pouch. In an embodiment, the process includes squeezing the storage compartment 152a and dispensing from the pouch 150a, a spray pattern 160a of the liquid 156a, as shown in FIG. 27. FIG. 27 shows the dispensing of a low viscosity liquid 156a (such as a water-based liquid) as a fine and controlled spray. The spray pattern 160a and the spray flow intensity can be advantageously controlled by adjusting the amount of squeeze force imparted upon the storage compartment 152a as previously discussed. In this way, the flexible pouch 150a surprisingly and advantageously provides a flexible pouch and dispensing system that can be operated entirely by hand—i.e., hand removal of corner pocket 153a, and hand control (squeeze) of spray pattern 160a.

In an embodiment, the process includes squeezing the storage compartment 152b of pouch 150b and dispensing a pattern 160b of a viscous liquid 156b, such as a lotion or a cream onto a surface, such as a person's skin, as shown in FIG. 31. The pattern 160b and the flow intensity can be advantageously controlled by adjusting the amount of squeeze force imparted upon the storage compartment 152b as previously discussed. In this way, the flexible pouch 150b surprisingly and advantageously provides a flexible pouch and dispensing system for a high viscosity liquid (lotion, cream, paste, gel) that can be operated entirely by hand—i.e., hand removal of long pocket 153b, hand control (squeeze) of spray pattern 160b).

By way of example, and not limitation, examples of the present disclosure are provided.

EXAMPLES

Flexible multilayer films with structure shown in Table 1 below are used in the present examples.

1. Multilayer Film

TABLE 1

Composition of the Flexible Multilayer Film (Film 1) Laminated Multilayer Film

| Material | Description | Density (g/cm$^3$) ASTM D792 | Melt Index (g/10 min) ASTM D1238 (190° C./ 2.16 kg) | Melting Point (° C.) DSC | Thickness (micrometer) |
|---|---|---|---|---|---|
| LLDPE | Dowlex ™ 2049 | 0.926 | 1 | 121 | 20 |
| HDPE | Elite ™ 5960G | 0.962 | 0.85 | 134 | 20 |
| LLDPE | Elite ™ 5400G | 0.916 | 1 | 123 | 19 |
| Adhesive Layer | Polyurethane solvent less adhesive (ex. Morfree 970/CR137) | | | | 2 |
| HDPE | Elite ™ 5960G | 0.962 | 0.85 | 134 | 19 |
| HDPE | Elite ™ 5960G | 0.962 | 0.85 | 134 | 20 |
| Seal Layer | Affinity ™ 1146 | 0.899 | 1 | 95 | 20 |
| Total | | | | | 120 |

2. Flexible Stand-Up Pouch with Microcapillary Strip Made In Situ (Example 1)

A. Microcapillary 1

The channels (capillaries) are produced by using a parallel array of hardened stainless steel wires disposed between two monolayer sheets of INFUSE™ 9500 previously prepared by compression molding.

Figure 12:
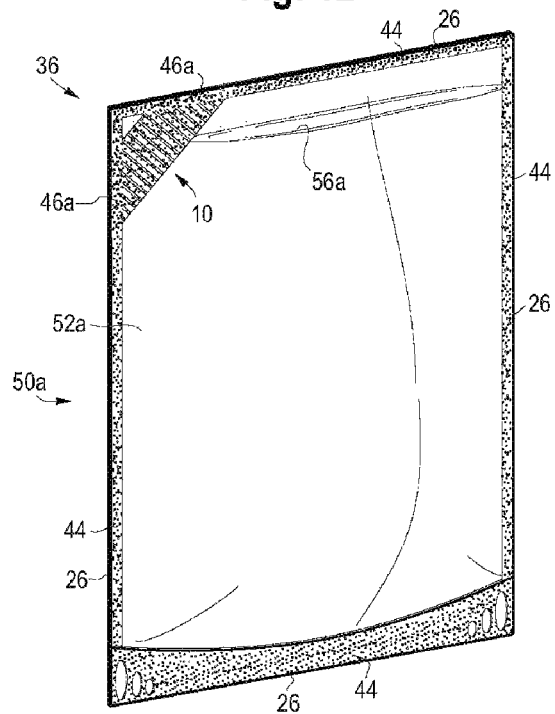
FIG. 12 is a perspective view of a filled and sealed flexible pouch in accordance with an embodiment of the present disclosure.

INFUSE™ 9500 strip dimensions: approximately 1 cm by 5 cm
  Thickness (T): 0.22 mm
  Stainless steel wire diameter (D): 0.22 mm
  Wire spacing (S): 0.44 mm
  Number of pins: 17
  B. Microcapillary 2
  The channels (capillaries) are produced by using a CPE with an array of non-parallel (divergent) nickel titanium alloy wires disposed between two monolayer sheets of INFUSE™ 9107 (INFUSE™ strips) previously prepared by compression molding.
  INFUSE™ 9107 strip dimensions: approximately 1 cm by 5 cm
  Thickness (T): 300 micrometers
  Stainless steel wire diameter (D): 400 micrometers
  Wire spacing (S): 800 micrometers at the base
  Number of pins: 13
  C. Process
  1. The capillary precursor element includes an array with stainless steel wires that is placed between the two INFUSE™ strips. The wires can be parallel to each other. Alternatively, the wires are divergent, or non-parallel, with respect to each other. The INFUSE™ strips cover the total width of the wire array and have an excess of approximately 10 mm on each side. The INFUSE™ strips do not cover the length of the wires leaving approximately 5 mm of uncovered wires on each side. The capillary precursor element is then placed between two opposing pieces of Film 1. The seal layers face each other and the two Film 1 films are arranged to form a common peripheral edge. The capillary precursor element is placed in the Brugger HSG-C heat sealer equipped with a Teflon coated heat seal bar measuring 6 mm by 150 mm and first heat sealed for 1 second at 120° C. with 900 Newton (N) force corresponding to a pressure of 100 N/cm². The first sealing process results in the complete fusion of the two INFUSE™ strips around the steel wires, completely encapsulating them and forming a polymeric matrix. The first sealing simultaneously seals the matrix to the back film and the front film of the pouch.
  2. The steel wire array is subsequently extracted from the pouch by pulling away by hand, revealing an array of round channels connecting the inside of the package. The wire array is easily removed by hand without any damage to the pouch or the formed channels.
  3. The pouch is filled with tap water through the opposite corner which was also left opened to 75% of the maximum pouch volume.
  4. The water-filled pouch is closed by second heat sealing the edges in the same Brugger HSG-C heat sealer equipped with a Teflon coated heat seal bar measuring 6 mm by 150 mm at 130° C. and 900 N of seal force corresponding to a pressure of 100 N/cm². The second seal force is high enough to collapse the channels at the peripheral edge and completely seal the pouch. The filled and sealed flexible pouch having finished corner with example Microcapillary 1 showing the in situ microcapillary strip with parallel channels installed is shown in FIG. 12 and FIG. 14.
  The corner of example Microcapillary 2 showing in situ microcapillary strip with non-parallel channels is shown in FIG. 8A.
  5. Excess material left over from the strips during the sealing process is trimmed to finish the packaging.
  D. Functionality Demonstration
  The corner of the pouch is cut off using a regular scissors to remove sealed microcapillary segment, thereby exposing the edges of the channels. The pouch is gently squeezed by hand and a fine spray of water is discharged from the pouch, as depicted in FIG. 14 (parallel channels) and FIG. 14A (non-parallel channels).

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A process for producing a flexible pouch comprising:
    placing a capillary precursor element (CPE) between two opposing flexible films, the flexible films defining a common peripheral edge, the CPE comprising an array of pins sandwiched between two opposing polymeric strips;
    positioning a first side of the CPE at a first side of the common peripheral edge and positioning a second side of the CPE at a second side of the common peripheral edge;
    first sealing, at a first seal condition, (i) the opposing polymeric strips to each other to form a matrix, and (ii) sealing the matrix to the two opposing flexible films; and
    removing the array of pins from the matrix to form an in situ microcapillary strip.

2. The process of claim 1 comprising second sealing, at a second seal condition, a peripheral seal along at least a portion of the common peripheral edge, the peripheral seal comprising a sealed microcapillary segment.

3. The process of claim 2 comprising forming, with the second sealing, a flexible pouch having a storage compartment.

4. The process of claim 3 wherein the flexible pouch comprises a fill inlet at an unsealed portion of the common peripheral edge, the process comprising filling, through the fill inlet, the storage compartment with a liquid.

5. The process of claim 4 comprising third sealing the fill inlet and forming a closed and filled flexible pouch.

6. The process of claim 4 comprising removing a portion of the sealed microcapillary segment;
    exposing outer edges of channels present in the in situ microcapillary strip;
    squeezing the storage compartment; and
    dispensing, through the channels the liquid from the flexible pouch.

7. The process of claim 6 wherein the removing comprises cutting the portion of the sealed microcapillary segment from the flexible pouch.

8. The process of claim 1, wherein the common peripheral edge defines a 4-sided polygon, the process comprising first positioning the first side of the CPE at a first side of the 4-sided polygon; and
    second positioning the second side of the CPE at an intersecting side of the 4-sided polygon.

9. The process of claim 1, wherein the common peripheral edge defines a 4-sided polygon, the process comprising first positioning the first side of the CPE at a first side of the 4-sided polygon; and
    second positioning the second side of the CPE at a parallel side of the 4-sided polygon.

10. A process for producing a flexible pouch comprising:
    placing a capillary precursor element (CPE) at an edge offset distance between two opposing flexible films, the flexible films defining a common peripheral edge, the CPE comprising an array of pins sandwiched between two opposing polymeric strips;

positioning a first side of the CPE at a first side of the common peripheral edge and positioning a second side of the CPE at a second side of the common peripheral edge;

first sealing, at a first seal condition, (i) the opposing polymeric strips to each other to form a matrix, and (ii) sealing the matrix to the two opposing flexible films; and removing the array of pins from the matrix to form an in situ microcapillary strip.

11. The process of 10 comprising second sealing, at a second seal condition, a peripheral seal along at least a portion of the common peripheral edge, the peripheral seal comprising a sealed microcapillary segment.

12. The process of claim 11 comprising forming, with the second sealing, a flexible pouch having a storage compartment and a pocket.

13. The process of claim 12 wherein the flexible pouch comprises a fill inlet at an unsealed portion of the common peripheral edge, the process comprising filling, through the fill inlet, the storage compartment with a liquid.

14. The process of claim 13 comprising third sealing the fill inlet and forming a closed and filled flexible pouch.

15. The process of claim 13 comprising removing the pocket from the pouch;

exposing outer edges of channels present in the in situ microcapillary strip;

squeezing the storage compartment; and dispensing, through the channels, the liquid from the pouch.

16. The process of claim 15 wherein the removing comprises hand tearing the pocket from the flexible pouch.

17. The process of claim 10, wherein the common peripheral edge defines a 4-sided polygon, the process comprising first positioning the first side of the CPE at a first side of the 4-sided polygon; and second positioning the second side of the CPE at an intersecting side of the 4-sided polygon.

18. The process of claim 10, wherein the common peripheral edge defines a 4-sided polygon, the process comprising first positioning the first side of the CPE at a first side of the 4-sided polygon; and second positioning the second side of the CPE at a parallel side of the 4-sided polygon.

\* \* \* \* \*